US010047760B2

(12) United States Patent
Sanketh et al.

(10) Patent No.: US 10,047,760 B2
(45) Date of Patent: Aug. 14, 2018

(54) TURBINE WASTEGATE PLUG

(71) Applicant: Honeywell International Inc., Morris Plains, NJ (US)

(72) Inventors: Sanketh, Bangalore (IN); Santosh C. Bhoosthali, Bangalore (IN); Kiran Pithamber, Bangalore (IN); Isahaak M P, Bangalore (IN); Kiran Somashekar Rao Nazare, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 758 days.

(21) Appl. No.: 14/555,569

(22) Filed: Nov. 26, 2014

(65) Prior Publication Data
US 2016/0146213 A1 May 26, 2016

(51) Int. Cl.
*F02B 37/18* (2006.01)
*F16K 1/20* (2006.01)
*F04D 27/00* (2006.01)
*F04D 17/10* (2006.01)
*F04D 25/04* (2006.01)

(52) U.S. Cl.
CPC .......... *F04D 27/009* (2013.01); *F02B 37/183* (2013.01); *F04D 17/10* (2013.01); *F04D 25/045* (2013.01); *F16K 1/2014* (2013.01); *Y02T 10/144* (2013.01)

(58) Field of Classification Search
CPC ............... F04D 27/009; F04D 27/0207; F04D 27/0214; F04D 15/0011; F04D 15/0005; F04D 17/10; F04D 25/045; F16K 1/2014; F16K 1/20; F02B 37/183; F02B 37/18; F02B 37/186; F01D 17/20; F01D 17/105; F01D 25/24

USPC .................................. 60/602; 251/298-301
See application file for complete search history.

(56) References Cited

U.S. PATENT DOCUMENTS

| 4,098,085 | A | 7/1978 | McDowell |
| 4,794,758 | A | 1/1989 | Nakazawa et al. |
| 6,205,784 | B1 | 3/2001 | Knaack et al. |
| 6,381,960 | B1 | 5/2002 | Mardberg |
| 6,543,228 | B2 | 4/2003 | Deacon |
| 6,564,554 | B2 | 5/2003 | Hercey et al. |

(Continued)

FOREIGN PATENT DOCUMENTS

| DE | 19705422 C1 | 9/1998 |
| DE | 19853391 A1 | 5/2000 |

(Continued)

OTHER PUBLICATIONS

EP 15195261.1, Search and Exam Report of Feb. 16, 2016 (6 pages).

*Primary Examiner* — Logan Kraft
*Assistant Examiner* — Danielle M Christensen
(74) *Attorney, Agent, or Firm* — Brian J. Pangrle

(57) ABSTRACT

An assembly can include a turbine housing that defines a bore, a wastegate opening, a wastegate passage to one side of the wastegate opening and a chamber to another side of the wastegate opening and that includes a wastegate seat disposed about the wastegate opening; a rotatable wastegate shaft configured for receipt by the bore; a wastegate arm that extends from the wastegate shaft; and a wastegate plug that extends from the wastegate arm where the wastegate plug includes a seal surface that includes a toe end and a back end where the back end includes a radius of curvature that exceeds a radius of curvature of the toe end.

11 Claims, 18 Drawing Sheets

(56) References Cited

U.S. PATENT DOCUMENTS

| | | | |
|---|---|---|---|
| 6,983,596 | B2 | 1/2006 | Frankenstein et al. |
| 7,481,056 | B2 | 1/2009 | Blaylock et al. |
| 2011/0173974 | A1 | 7/2011 | Grabowska |

FOREIGN PATENT DOCUMENTS

| | | |
|---|---|---|
| DE | 103 44 815 A1 | 4/2004 |
| DE | 10344815 A1 | 4/2004 |
| DE | 10 2012 015536 A1 | 2/2014 |
| EP | 1040268 B1 | 10/2000 |
| EP | 2444626 A1 | 4/2012 |
| EP | 2 489 853 A1 | 8/2012 |
| FR | 2906566 A1 | 4/2008 |
| JP | 1981-97530 U | 8/1981 |
| JP | 1990131032 U | 10/1990 |
| WO | 2006046810 A1 | 5/2006 |
| WO | 2010 036532 A2 | 4/2010 |
| WO | 2010039596 A2 | 4/2010 |

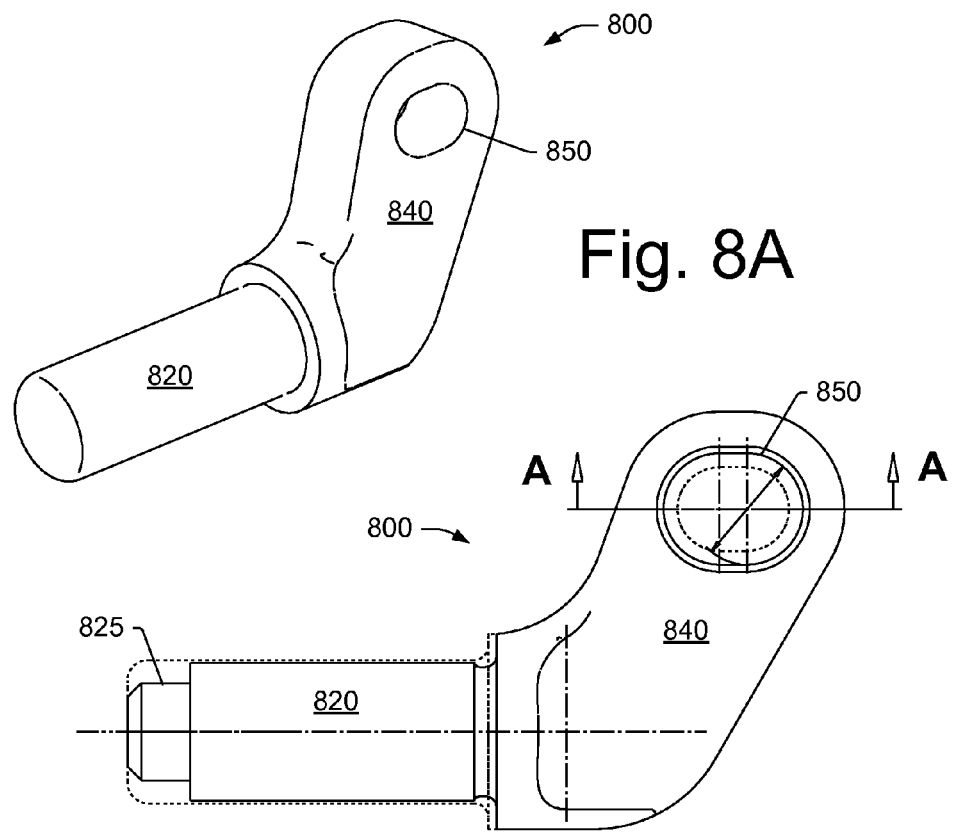
Fig. 8A
Fig. 8B
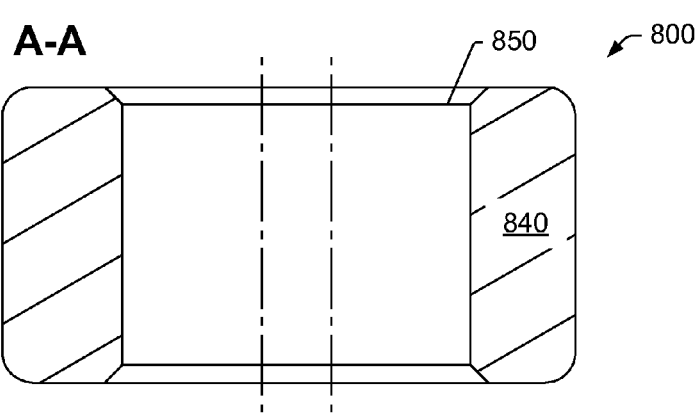
Fig. 8C

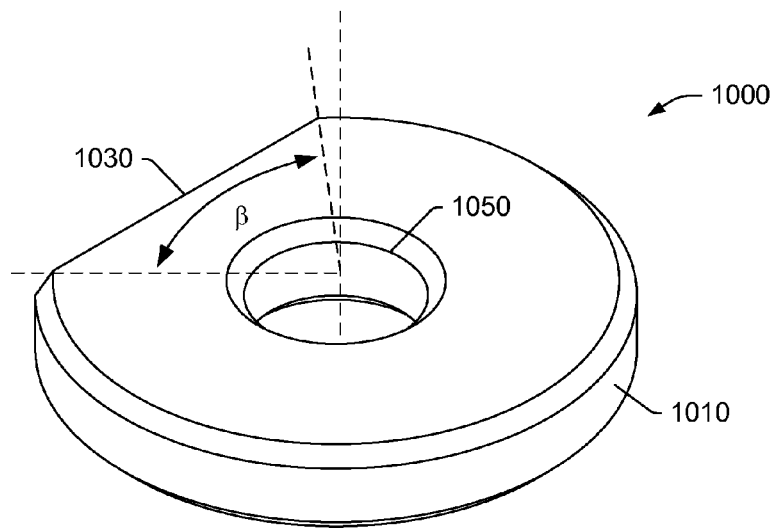
Fig. 10A
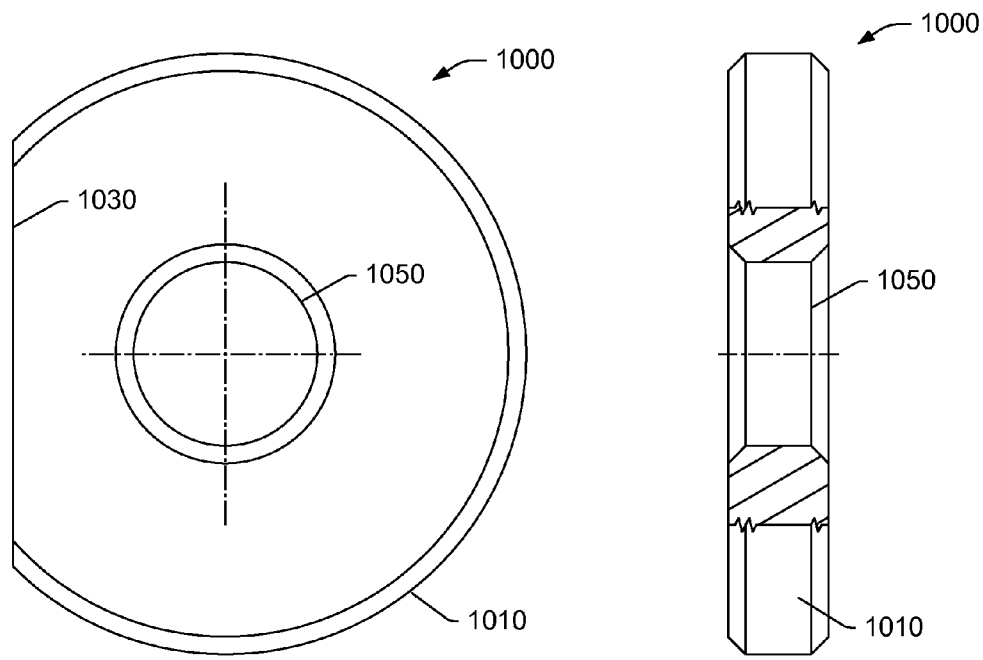
Fig. 10B
Fig. 10C

US 10,047,760 B2

TURBINE WASTEGATE PLUG

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 8A, 8B and 8C are a perspective view, a plan view and a cross-sectional view along a line A-A of an example of an arm and shaft unit;

FIGS. 10A, 10B and 10C are a perspective view, a plan view and a cut-away view of an example of a component;

DETAILED DESCRIPTION

Figure 1:
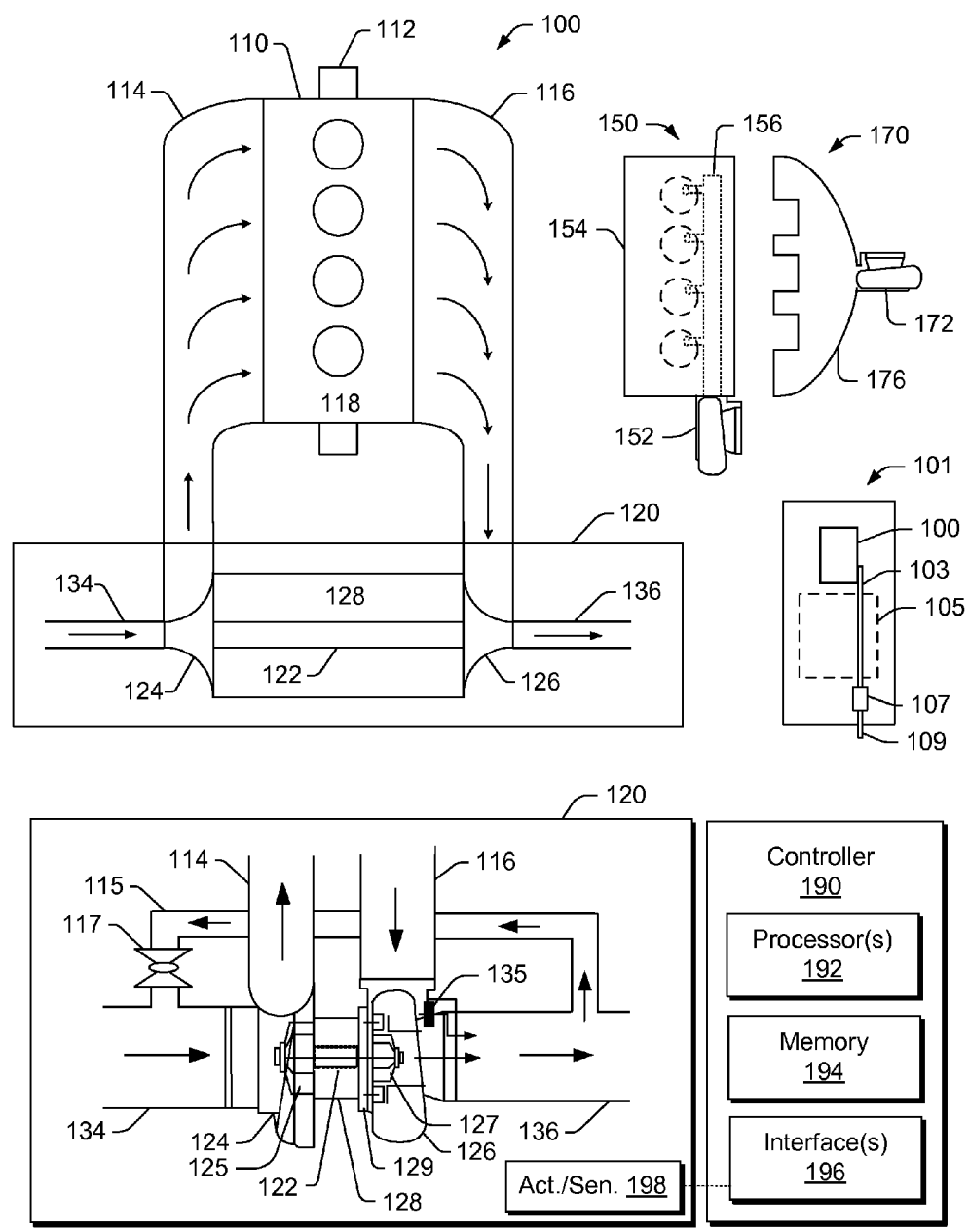
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2A:
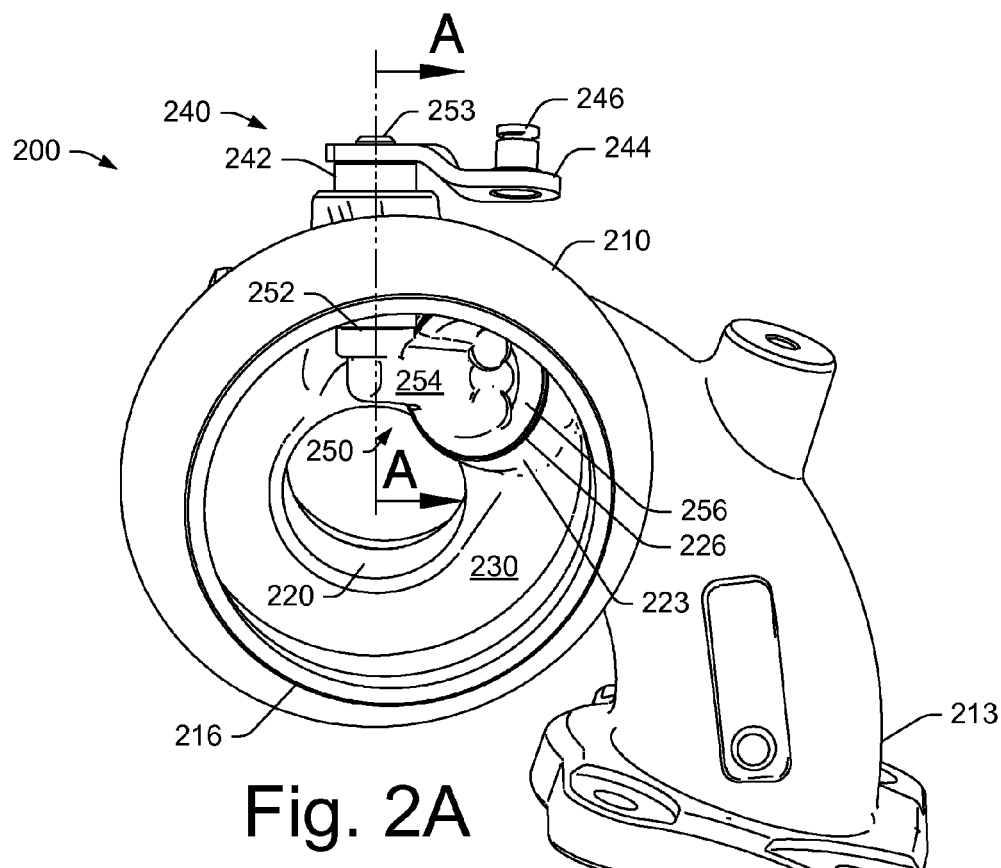
FIGS. 2A and B are a perspective view and a cross-sectional view along a line A-A of an example of an assembly that includes a wastegate.
Figure 2B:
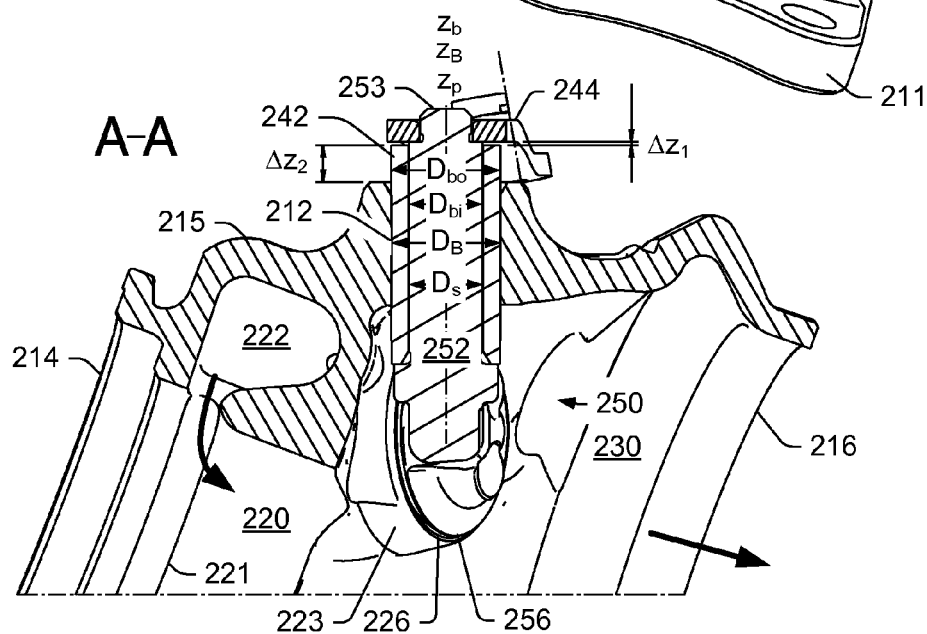

FIGS. 2A and 2B show an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIGS. 2A and 2B, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIGS. 2A and 2B, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing 242 includes an inner diameter $D_{bi}$ and an outer diameter $D_{bo}$. In the example of FIGS. 2A and 2B, when the various components are assembled, the diameters may be as follows: $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

In the example of FIGS. 2A and 2B, a gap $\Delta z_1$ is shown between a surface of the bushing 242 and a surface of the control arm 244, which allows for axial movement of the shaft 252, for example, to facilitate self-centering of the plug 256 with respect to the wastegate seat 226. Another gap $\Delta z_2$ is shown between an end surface of the bushing 242 and a surface of the housing 210. As shown in FIG. 2B, an opposing end surface of the bushing 242 is in contact with a surface of the shaft 252 (e.g., an annular face of a shoulder surface of the shaft 252).

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

As an example, the control linkage 240 may exert a force that acts to force the plug 256 in a direction toward the wastegate seat 226. For example, an actuator may include a biasing mechanism (e.g., a spring, etc.) that exerts force, which may be controllably overcome, at least in part, for rotating the plug 256 away from the wastegate seat 226 (e.g., for wastegating). As an example, an actuator may be mounted to a turbocharger (e.g., mounted to a compressor assembly, etc.). As an example, an actuator may be a linear actuator, for example, that includes a rod that moves along an axis. Depending on orientation of a plug, a shaft, a control linkage and such a rod, to maintain the plug in a closed position, the rod may exert a downward force (e.g., away from the control linkage as in the example of FIGS. 2A and 2B) or the rod may exert an upward force (e.g., toward the control linkage). For example, where the control arm 244 (e.g., and the peg 246) of the control linkage 240 are oriented on the same "side" as the plug 256 with respect to the shaft 252, a downward force applied to the control arm 244 (e.g., via the peg 246) may act to maintain the plug 256 in a closed position with respect to the wastegate seat 226; whereas, where, for example, an approximately 180 degree span exists between a plug and a control arm, an upward force applied to the control arm may act to maintain the plug in a closed position with respect to a wastegate seat.

As an example, a rod of an actuator may be biased to exert a force on a control linkage that causes the control linkage to exert a force on a plug (see, e.g., the plug 256) such that the plug seats against a wastegate seat (see, e.g., the wastegate seat 226). In such an example, the actuator may at least in part overcome the force that biases the rod such that a shaft rotates the plug away from the wastegate seat. For example, in FIGS. 2A and 2B, to initiate wastegating, the entire plug 256 rotates about an axis of the shaft 252 and moves away from the wastegate seat 226 (e.g., without any portion of the plug 256 moving into a wastegate opening defined by the wastegate seat 226). As an example, the moving away of the plug 256 may be facilitated by exhaust pressure. For example, in a closed position, the plug 256 experiences a pressure differential where pressure is higher below the plug 256 and less above the plug 256. In such an example, the pressure below the plug 256 acts in a direction that is countered by the closing force applied to the plug 256 via the control linkage 240 (e.g., the pressure differential acts to bias the plug 256 toward an open position). Accordingly, the closing force applied to the plug 256 should overcome pressure force from below the plug 256. Further, where the shaft 252 may include some play (see, e.g., $\Delta z$, etc.), the closing force applied to the plug 256 may cause the plug 256 to self-center with respect to the wastegate seat 226 (e.g., to facilitate sealing, to avoid exhaust leakage, etc.).

In the example of FIGS. 2A and 2B, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 3:
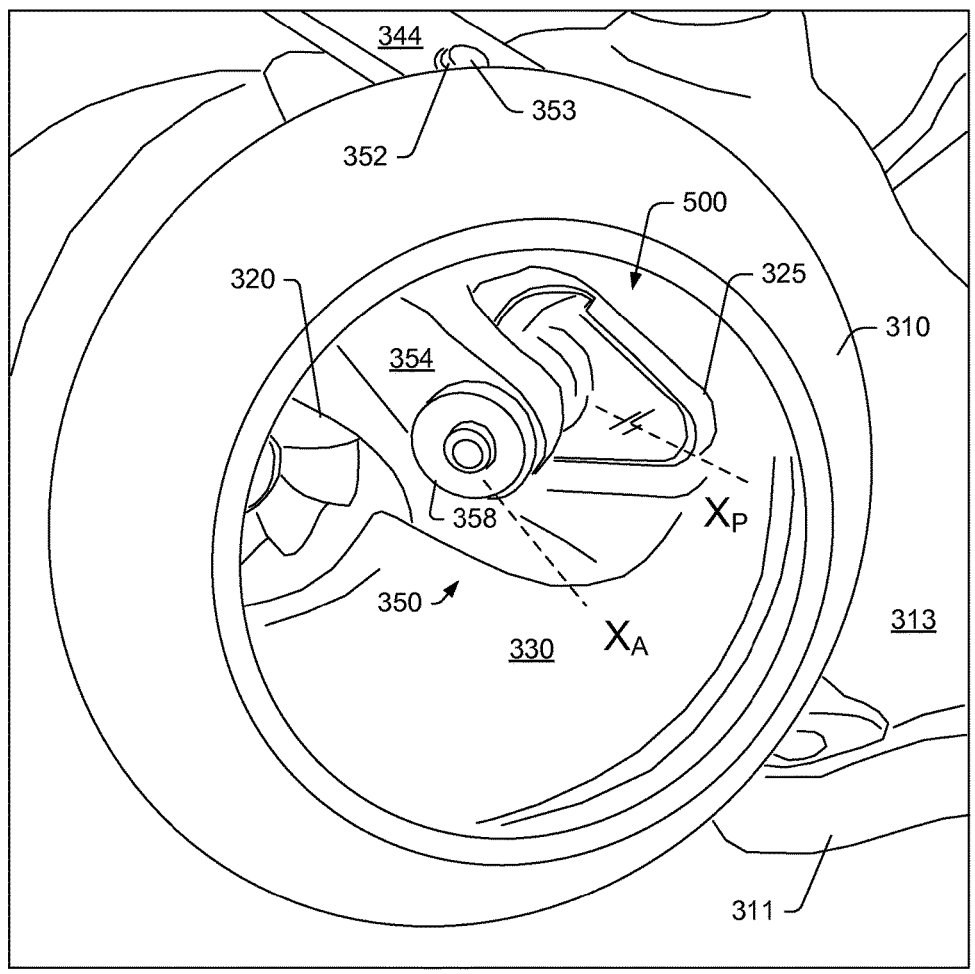
FIG. 3 is a series of views of an example of an assembly that includes a wastegate.

FIG. 3 shows an example of an assembly 300 that includes a wastegate arm and plug 350 that differs from the wastegate arm and plug 250 of the assembly 200 of FIGS. 2A and 2B and where a housing 310 differs from the housing 210 of FIGS. 2A and 2B. In particular, the wastegate arm and plug 350 includes a plug 500 that includes a non-circular seal surface and the housing 310 includes an opening 325 with a non-circular shape to accommodate the plug 500 where a non-circular wastegate seat borders the opening 325.

In the example of FIG. 3, the assembly 300 includes the housing 310 which includes a flange 311, an inlet conduit 313, and a turbine wheel space opening 320 that is in fluid communication with a chamber 330 that is defined at least in part by the housing 310. In the example of FIG. 3, a turbine wheel 302 is disposed at least in part in the turbine wheel space, which is defined at least in part by the housing 310.

As shown, the plug 500 of the arm and plug sub-assembly 350 is operatively coupled to an arm 354 that extends to a shaft 352 that extends through a bore defined by the housing 310 (see, e.g., the bore 212 of FIGS. 2A and 2B) where, proximate to an end 353 of the shaft 352, the shaft 352 is operatively coupled to a control arm 344. As an example, the control arm 344 may be operatively coupled to an actuator, for example, via a linkage. In such an example, the actuator may apply force that is transmitted from the control arm 344 to the arm 354 and to the plug 500.

Figure 5:
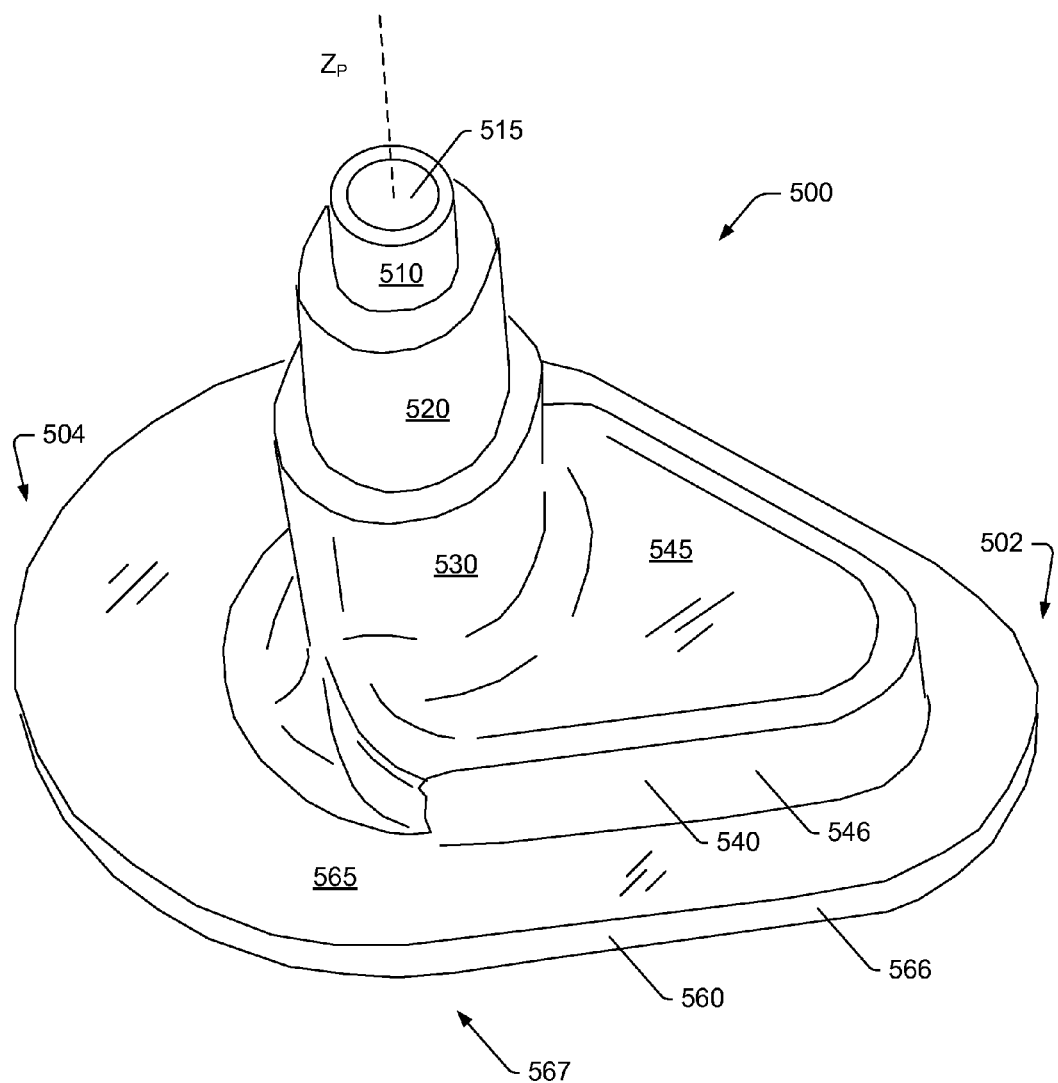
FIG. 5 is a perspective view of an example of a wastegate plug.
Figure 6A:
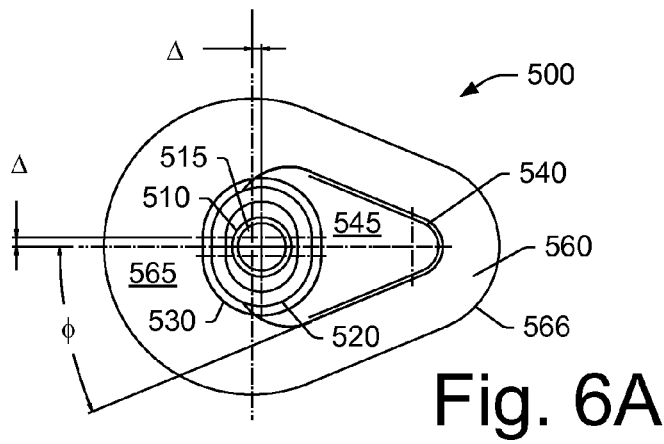
FIGS. 6A to 6E are various views of the wastegate plug of FIG. 5.
Figure 6B:
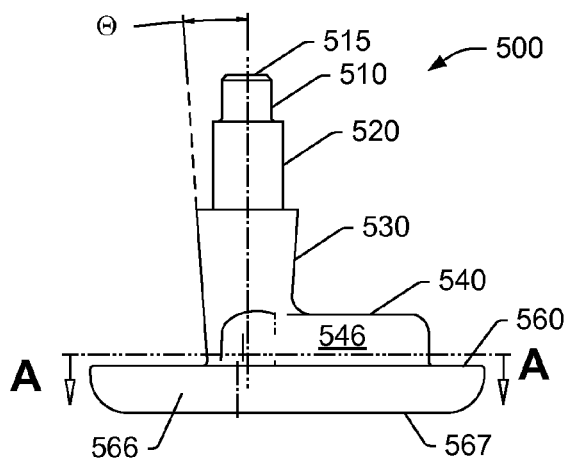
Figure 6C:
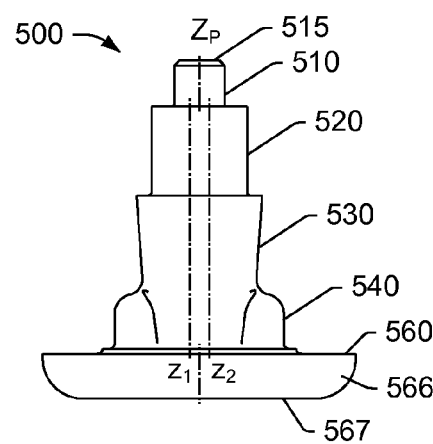
Figure 6D:
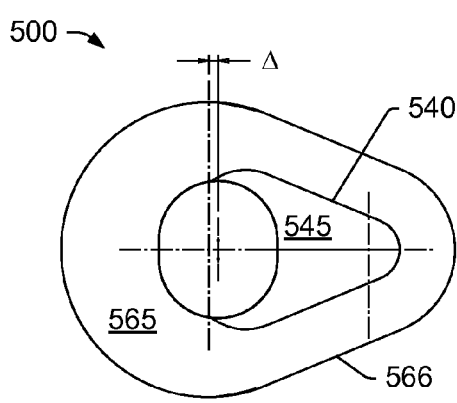
Figure 6E:
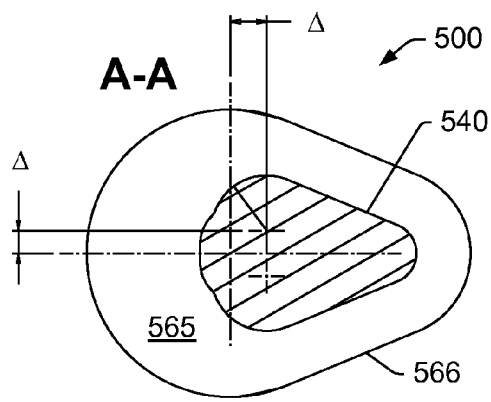

In the example of FIG. 5, the plug 500 opens into a passage rather than opening into the chamber 330; however, as an example, a plug with a shape such as the plug 500 may open into a chamber rather than opening into a passage. For example, consider the example of FIGS. 2A and 2B where the plug portion 356 opens into the chamber 230. An actuator may be configured to apply a force to open a plug whether the plug opens to a chamber or to a passage.

As an example, a plug may include a non-circular shape and may include a non-circular (e.g., non-circular annular) sealing surface. In such an example, the plug may approach a wastegate seat from a chamber side or from a passage side. For example, a plug may open by moving into a chamber or may open by moving into a passage.

In the example of FIG. 3, the arm 354 may be coupled to the plug 500 to move the plug 500 where the arm 354 defines in part an axis of movement of the plug (see, e.g., $X_A$) and an axis of orientation of the plug 500 (see, e.g., $X_P$). As an example, the axis $X_A$ and the axis $X_P$ may be offset by an angle of rotation, which may be measured, for example, about an axis of a stem, a peg, etc. of the plug 500.

As an example, a wastegate may experience fluttering. Fluttering may be a consequence of pulsations in exhaust received by a housing. For example, the flange 311 of the housing 310 may be operatively coupled to an exhaust outlet of an internal combustion engine that includes reciprocating pistons coupled to crankshaft. As the pistons reciprocate, valves provide for receipt of intake air and expulsion of exhaust, which may pulsate due to the reciprocating nature of the pistons and opening and closing of valves (e.g., head valves).

As an example, a manifold may be considered a divided manifold that separates flow of exhaust from cylinders whose cycles may interfere with one another (e.g., as to exhaust pulse energy). For example, on a four-cylinder engine with firing order 1-3-4-2, cylinder #1 is ending its expansion stroke and opening its exhaust valve while cylinder #2 still has its exhaust valve open (cylinder #2 is in its overlap period). In an undivided exhaust manifold, a pressure pulse from cylinder #1's exhaust blowdown event may be more likely to contaminate cylinder #2 with high pressure exhaust gas, which can impact performance of cylinder #2's (e.g., ability to breathe properly) and diminish pulse energy that may have been better utilized in by a turbine. As an example, a proper grouping for the aforementioned engine may keep complementary cylinders grouped together (e.g., exhaust of cylinders #1 and #4 as one complementary group and cylinders #2 and #3 as another complementary group). Such an approach may better utilize exhaust pulse energy and, for example, improve turbine performance (e.g., increase boost more rapidly). As an example, a plug may include a non-circular shape and may cover an opening or openings that may be in fluid communication with multiple passages. As an example, where a plug includes a "V" shape (e.g., including a toe end and a back end), it may cover two openings where a divider wall may run from the open to the closed end of such a V-shaped plug when the plug is in a closed position. In such an example, the plug may open in to a chamber (e.g., rather than open into a passage). As an example, multiple passages may be in fluid communication with a common passage where a plug opens in to the common passage (e.g., where sufficient clearance exists).

As an example, a plug that opens into a passage may experience less risk of leakage in response to pulsating exhaust pressure. For example, as the plug's sealing surface is on the high pressure side of a wastegate opening, it opens into the passage against the direction of flow of exhaust through the wastegate opening and a closing force may be applied that acts in a direction of an exhaust pressure differential (e.g., from high pressure in a passage and lower pressure in a chamber), Such an example differ from a plug that opens into a chamber where, for example, a closing force is applied to a plug in a direction against the pressure differential (e.g., a force sufficient to overcome a pressure differential between a high pressure passage and a lower pressure chamber).

As an example, a plug, a wastegate opening and/or a wastegate seat may be non-circular (e.g., in a plane). As an example, a non-circular configuration may improve flow characteristics of exhaust through a wastegate opening. For example, a non-circular arrangement may provide for a more linear response as to mass flow versus opening angle of a plug with respect to a wastegate seat. In the example of FIG. 3, the wastegate plug 500 may be referred to as including a "V" shape (e.g., a shape with a toe end and a back end). In such an example, the wastegate plug 500 includes a toe end and a back end where the back end (e.g., open end of a "V" shape) includes a radius of curvature that exceeds a radius of curvature of the toe end (e.g., closed end of a "V" shape).

As an example, a plug can include a rib or elevated region that may act to direct flow. For example, where a plug opens into a passage, a "back" side of the plug may include an elevated region that forms a clearance with respect to a wastegate opening such that exhaust flows through the clearance. Such an approach may help to regulate flow through the wastegate opening (e.g., at low opening angles from about 0.1 degrees to about 10 degrees or more). As an example, a toe end of a plug may move away from a wastegate opening a greater distance than a back end of the plug. In such an example, flow area may be less than if the back end of the plug were the first end to move away from the wastegate opening (e.g., where the back end is larger than the toe end).

As an example, a non-circular plug and opening may be implemented in a generator that may handle an air and gas mixture. As an example, consider a gas engine with a range in power from about 0.1 to about 10 MW, which may run on natural gas or one or more other gases (e.g., biogas, landfill gas, coal mine gas, sewage gas, combustible industrial waste gas, etc.).

As an example, a plug can include a non-circular sealing surface (e.g., a sealing surface with a non-circular shape), which may facilitate an ability to achieve lower flows at lower lifts (e.g., control or opening angles as may be defined by rotation of a shaft to which the plug is operatively coupled). Such a shape may help to improve aerodynamic flow around a plug, which may act to minimize the impact of intrusion of the plug into an exhaust passage that leads to a volute that directs exhaust to a turbine wheel space (e.g., via a nozzle, nozzles, vanes, etc.).

As an example, a plug and opening may be shaped to reduce opening force beyond a certain minimum lift, for example, up to which point, the opening force may be slightly greater. For example, a plug may be oriented in exhaust flow in a manner where the exhaust flow aids in opening the plug. As an example, such an approach may be implemented in a gasoline engine application where an open orientation of a plug with respect to an opening may be called for by a controller more frequently than in a diesel engine application (e.g., consider more frequent wastegating in a gasoline engine application). Wastegating in a gasoline engine application may occur more frequently than in a diesel engine application as a gasoline engine may, for example, be operated often at a partial load (e.g., with a throttled inlet condition where boosting may not be needed). As an example, a plug and opening may be shaped in a manner that helps to reduce current applied to an electrical actuator (e.g., as operatively coupled to a wastegate control arm, etc.), which may possibly lead to some electrical energy saving. As an example, an actuator may be one or more of electrical, pneumatic, mechanical, etc. As an example, an actuator may be controlled via an engine control unit (e.g., an ECU).

As an example, a non-circular shape of a plug and an opening may be tailored to allow for assembly of a wastegate valve from a turbine discharge side. For example, via orientation of a plug with respect to an opening, a portion of the plug may be fit through the opening and, for example, oriented to be coupled to an arm (see, e.g., the arm 354 of FIG. 3). In such an example, an exhaust volute may be integrated with an exhaust manifold. For example, in FIG. 1, the manifold 176 may include the turbine housing assembly 172 in an at least in part an integrated manner. For example, a volute wall may be integrated at least in part with the manifold 176. In such an example, an ability to introduce a plug from an outlet side of a turbine housing may facilitate assembly.

As an example, a surface of a plug that faces a passage may be flat or may include a shape, for example, that may be domed outwardly (e.g., convex) or, for example, domed inwardly (e.g., concave). With a convex shape, exhaust may be directed toward edges of the plug while, with a concave shape, exhaust may apply pressure to the plug and distribute the pressure.

As mentioned, a plug can include a ribbed or elevated feature that may assist with directing flow of exhaust (e.g., for low lift flow control, etc.). As an example, depending on shapes of a plug and opening, a plug may be a unitary piece or it may be integral to an arm and/or a shaft (e.g., a mono-block arm and plug or a mono-block shaft, arm and plug).

Figure 4:
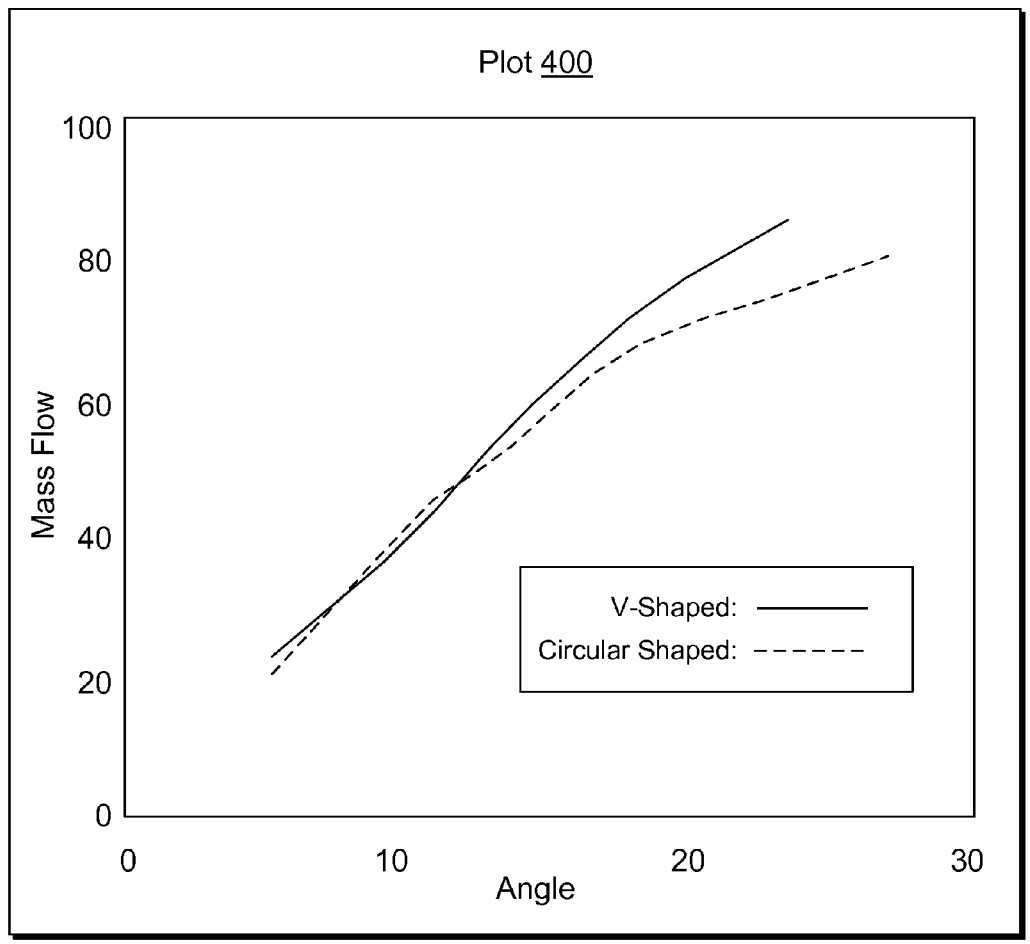
FIG. 4 is an example of a plot of trial data for a V-shaped wastegate plug and a circular shaped wastegate plug.

FIG. 4 shows an example of a plot 410 of mass flow versus angle for a circular shaped plug and opening and a V-shaped plug and opening. As shown, the V-shaped plug and opening provide for a more linear response of mass flow with respect to angle when compared to the circular shaped plug and opening (see, e.g., the circular plug and opening of FIGS. 2A and 2B and the V-shaped plug and opening of FIG. 3).

FIG. 5 shows a perspective view of the wastegate plug 500. As shown, the plug 500 includes a toe end 502, a back end 504, a washer peg portion 510 that extends to a peg end 515, an arm peg portion 520, a stem portion 530, an elevated portion 540 and a plug portion 560. As shown in FIG. 5, the washer peg portion 510, the arm peg portion 520 and the stem portion 530 may be aligned along a common axis ($Z_P$). As an example, an arm may include an opening that can receive the arm peg portion 520 where a washer or other fixing component may be fixed to the washer peg portion 510 to thereby fix the plug 500 to the arm.

As shown in FIG. 5, the plug portion 560 includes an upper surface 565, an edge surface 566 and a lower surface 567. As an example, the upper surface 565 may be a seal surface that can seat against a wastegate seat. In FIG. 5, the elevated portion 540 includes an upper surface 545 and a side surface 546. The elevated portion 540 includes a V shape with a perimeter that can be scaled down from a portion of a perimeter of the plug portion 560. In such an example, the elevated portion 540 defines a width of the upper surface 565 of the plug portion 560, which may be at least in part a seal surface that can seat against a wastegate seat (e.g., of a turbine housing).

The plug 500 may be sized to be able to be fit into a wastegate opening and to be oriented such that an arm can be fit to the arm peg portion 520. As an example, the axial height along the $Z_P$ axis may be sufficient to facilitate coupling to an arm and manipulation thereof for fitting into place but limited so as to allow for maneuvering of the plug 500 to properly position it where, for example, the plug 500 is to open into a passage (e.g., rather than opening into a chamber).

FIGS. 6A to 6E are various views of the wastegate plug 500 of FIG. 5. As shown, the elevated portion 540 may be defined at least in part via an angle $\phi$. The angle $\phi$ may be defined by a perimeter (e.g., the surface 546) of the elevated portion 540 and a longitudinal axis (e.g., extending from a tip of a nose end to a back end of the plug portion 560). As shown, the angle $\phi$ may define a portion of the perimeter 566 of the plug portion 560.

As shown, the stem portion 530 may be defined at least in part by an angle $\Theta$, for example, as measured from the axis $Z_P$. The arm peg portion 520 may be defined by two axes $z_1$ and $z_2$, which may be define a line that is orthogonal to the longitudinal axis of the wastegate plug 500.

Figure 7A:
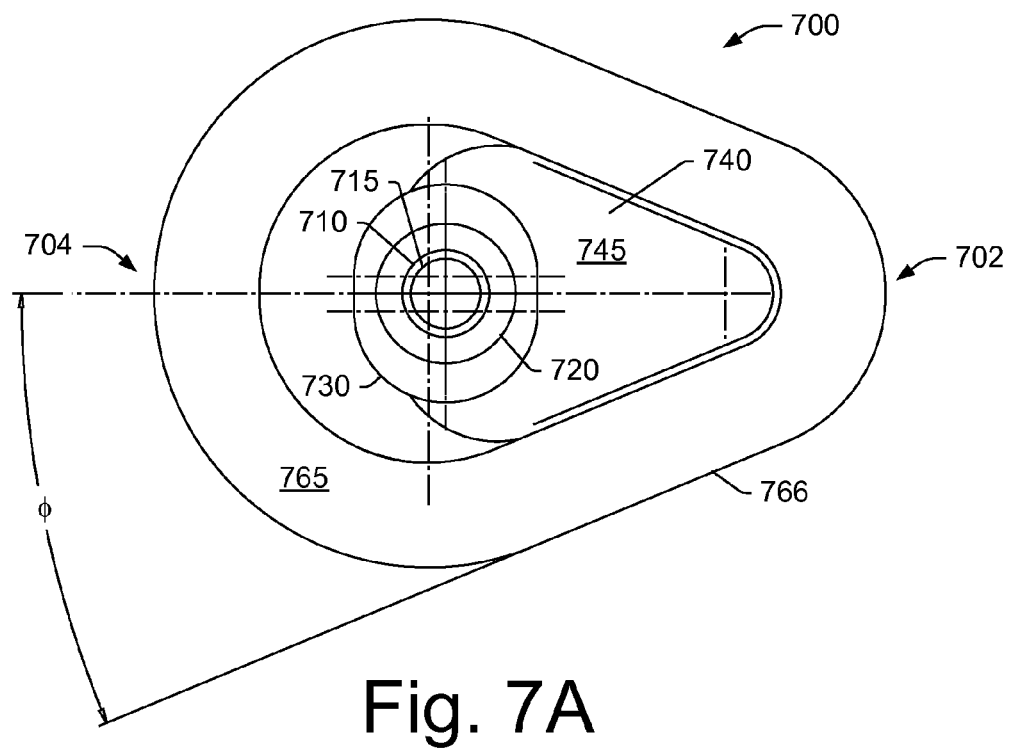
FIGS. 7A and 7B are a plan view and a side view of an example of a wastegate plug.
Figure 7B:
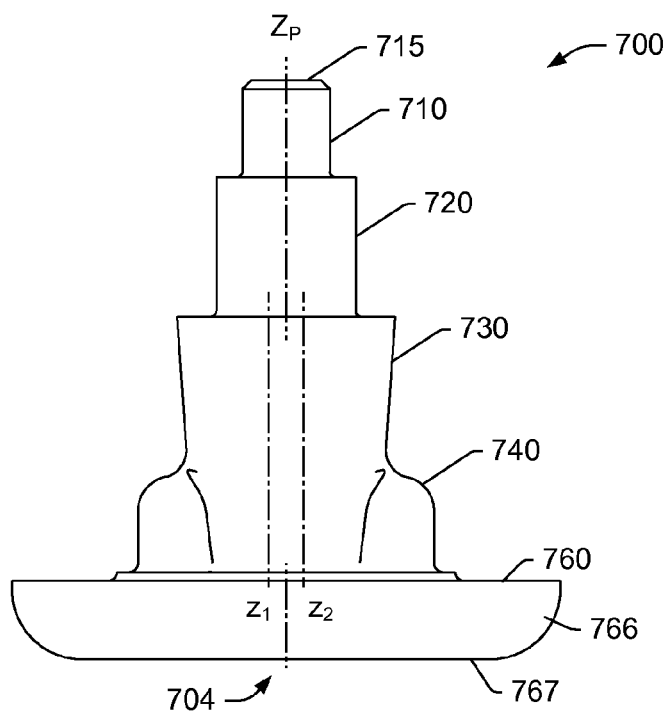

FIGS. 7A and 7B are a plan view and a side view of an example of a wastegate plug 700. As shown, the plug 700 includes a toe end 702, a back end 704, a washer peg portion 710 that extends to a peg end 715, an arm peg portion 720, a stem portion 730, an elevated portion 740 and a plug portion 760. As shown in FIGS. 7A and 7B, the washer peg portion 710, the arm peg portion 720 and the stem portion 730 may be aligned along a common axis ($Z_P$). As an example, an arm may include an opening that can receive the arm peg portion 720 where a washer or other fixing component may be fixed to the washer peg portion 710 to thereby fix the plug 700 to the arm.

As shown in FIGS. 7A and 7B, the plug portion 760 includes an upper surface 765, an edge surface 766 and a lower surface 767. As an example, the upper surface 765 may be a seal surface that can seat against a wastegate seat. In FIGS. 7A and 7B, the elevated portion 740 includes an upper surface 745 and a side surface 746. The elevated portion 740 includes a V shape with a perimeter that can be scaled down from a portion of a perimeter of the plug portion 760. In such an example, the elevated portion 740 defines a width of the upper surface 765 of the plug portion 760, which may be at least in part a seal surface that can seat against a wastegate seat (e.g., of a turbine housing).

The plug 700 may be sized to be able to be fit into a wastegate opening and to be oriented such that an arm can be fit to the arm peg portion 730. As an example, the axial height along the $Z_P$ axis may be sufficient to facilitate coupling to an arm and manipulation thereof for fitting into place but limited so as to allow for maneuvering of the plug 700 to properly position it where, for example, the plug 700 is to open into a passage (e.g., rather than opening into a chamber).

FIGS. 8A, 8B and 8C are a perspective view, a plan view and a cross-sectional view along a line A-A of an example of an arm and shaft unit 800 (e.g., optionally formed as an integral unit). As shown, the arm and shaft unit 800 includes a shaft 820 and an arm 840 where the arm 840 includes an opening 850. As shown, the opening 850 may be oblong in shape, for example, to receive the arm peg portion 520 of the wastegate plug 500 of FIG. 5. For example, the arm peg portion 520 may be oblong in shape and capable of being received by the opening 850 of the arm 840 (e.g., with clearance, an interference fit, etc.).

Figure 9A:
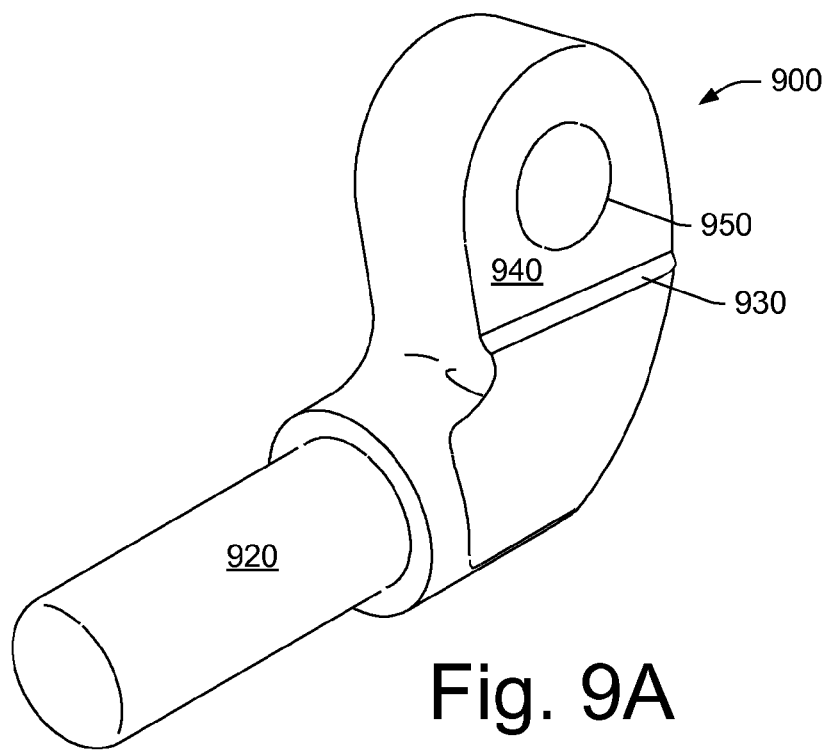
FIGS. 9A and 9B are a perspective view and a plan view of an example of an arm and shaft unit.
Figure 9B:
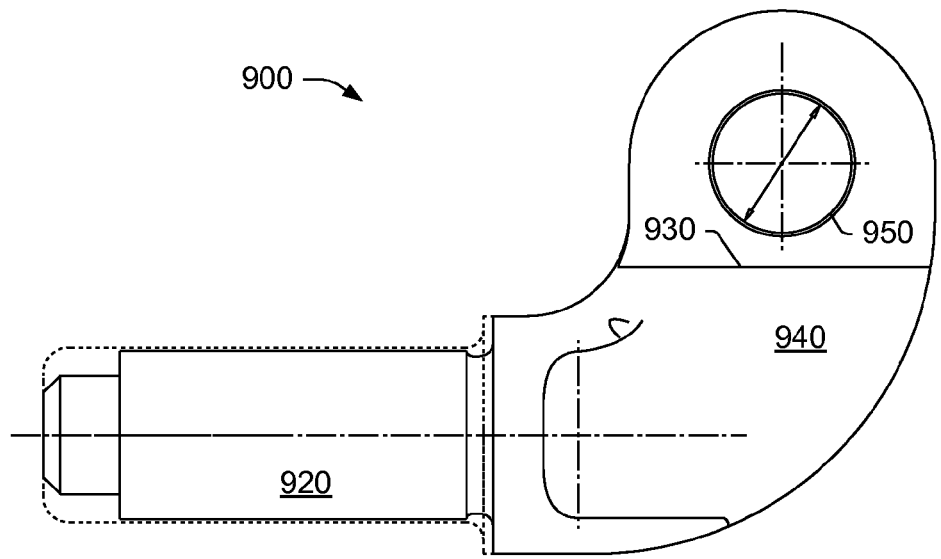

FIGS. 9A and 9B are a perspective view and a plan view of an example of an arm and shaft unit 900. As shown, the arm and shaft unit 900 includes a shaft 920, a locating edge 930 and an arm 940 where the arm 940 includes an opening 950. As shown, the opening 950 may be circular in shape, for example, to receive the arm peg portion 720 of the wastegate plug 700 of FIGS. 7A and 7B. For example, the arm peg portion 720 may be circular in shape (e.g., in cross-section) and capable of being received by the opening 950 of the arm 940 (e.g., with clearance, an interference fit, etc.).

FIGS. 10A, 10B and 10C are a perspective view, a plan view and a cut-away view of an example of a component 1000. As shown, the component 1000 includes a curved surface 1010, a flat surface 1030 and an opening 1050. In such an example, the opening 1050 may be sized to receive the peg portion 710 of the wastegate plug 700 of FIGS. 7A and 7B. As an example, the flat surface 1030 may be positioned adjacent to the locating edge of an arm such as, for example, the locating edge 930 of the arm 940 of the arm and shaft unit 900 of FIGS. 9A and 9B. In such an example, the locating edge 930 may act to limit rotation of the component 1000 by contacting the flat surface 1030 of the component 1000 where, for example, a portion of a wastegate plug is received via an opening of the arm 940 (e.g., the arm peg portion of a wastegate plug) and an opening of the component 1000 (e.g., a washer peg portion of a wastegate plug). As an example, a component may be washer with a flat (e.g., a flat surface) where the flat acts to orient the washer with respect to an arm. As shown in FIG. 10A, an angle $\beta$ (e.g., as measured about an axis of the opening 1050) may at least in part define the flat surface 1030. For example, the angle b may define ends of the flat surface 1030. As an example, the component 1000 may be defined by a radius and a height. In such an example, the flat surface 1030 may be defined by a radius that is perpendicular to the flat surface 1030 (e.g., from an axis of the opening 1050 to the flat surface 1030).

Figures 11A, 11B:
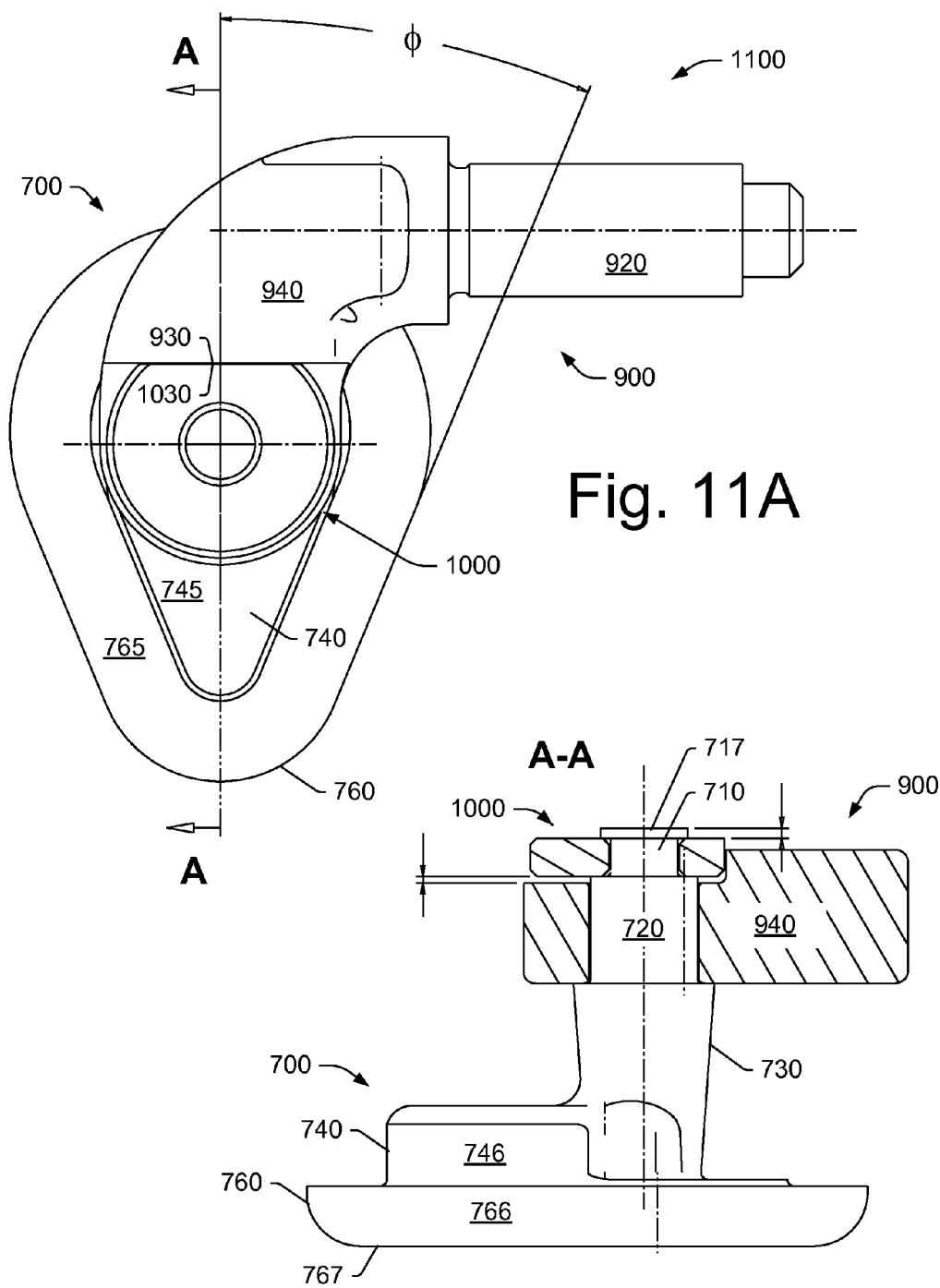
FIGS. 11A and 11B are a plan view and a cut-away view along a line A-A of an example of an assembly.

FIGS. 11A and 11B are a plan view and a cut-away view along a line A-A of an example of an assembly 1100. As shown, the assembly 1100 includes the wastegate plug 700, the arm and shaft unit 900 and the component 1000. As shown, the flat surface 1030 of the component 1000 is located adjacent to the locating edge 930 of the arm 940 of the arm and shaft unit 900.

As an example, a wastegate plug and a corresponding wastegate opening can be non-circular in shape. For example, a wastegate plug can include a non-circular surface that seats against a non-circular surface that defines at least in part a wastegate opening to seal the wastegate opening when the wastegate plug is in a closed orientation with respect to the wastegate opening. In such an example, the non-circular shapes can allow for control of flow area upon transitioning the wastegate plug to an open orientation with respect to the wastegate opening. For example, a wastegate plug can include a shape with a smaller dimension at a nose such that upon transitioning from a closed orientation to an open orientation flow area for exhaust is defined at least in part by the smaller dimension at the nose. Such an approach can provide for a wastegate plug with a cross-sectional plug area that may be approximately the same as, for example, a wastegate plug with a circular shape; however, with the non-circular shape a smaller flow area may be achieved upon transitioning from a closed orientation to an open orientation (e.g., for a given angle of rotation of a shaft operatively coupled to an arm that is operatively coupled to a wastegate plug).

As an example, a wastegate plug can include an elevated portion, which may extend upwardly from a surface of the wastegate plug toward an arm peg portion or that may extend downwardly from a surface of the wastegate plug away from an arm peg portion. For example, where a wastegate plug opens downwardly into a passage, an elevated portion that extends upwardly may move downwardly and act to define a flow area for exhaust. As another example, where a wastegate plug opens upwardly into a chamber, an elevated portion that extends downwardly may move upwardly and act to define a flow area for exhaust.

As an example, an elevated portion may be solid, hollow, a rib or ribs, etc. As an example, an elevated portion may act to restrict flow (e.g., at small shaft control angles). As an example, the influence of an elevated portion may diminish upon opening of a wastegate plug (e.g., as control angles increase and approach fully open). As an example, an elevated portion can control low end flow while providing for relatively higher flows at high lift angles.

As an example, a clearance parameter may be defined between an elevated portion and a wastegate opening for one or more orientations. As an example, a clearance parameter (e.g., a gap) may have a value that is of the order of a few millimeters or less.

As an example, a height parameter may be defined for an elevated portion (e.g., as may be measured with respect to a plug axis). As an example, an increase in value of a height parameter may reduce flow through the wastegate over a range open orientation control angles. As an example, a height parameter may have a value of the order of 10 mm or less (e.g., consider values of about 5 mm to about 6 mm). As an example, an elevated portion may include a plurality of heights, for example, an elevated portion may include a sloped upper surface (e.g., sloped from a plug axis to a toe end in a positive and/or negative manner).

As an example, a wastegate plug can include a plug portion that may be defined by two dimensions, D1 and D2. As an example, these dimensions may include a dimension of a circle, an ellipse, an ovoid, etc. As an example, D1 may correspond to a back end of a plug portion and D2 may correspond to a toe end of a plug portion.

As an example, for a given D1, a reduction in D2 can reduce flow area at small control angles. However, where for a relatively small D2, where an elevated portion is present, the elevated portion (e.g., depending on its size and shape) may act as an aerodynamic guide that may, for example, tend to increase flow. As an example, a parametric window of upper and lower limits from a flow point of view may exist with respect to dimensions D1 and D2 of a plug portion of a wastegate.

Figure 12:
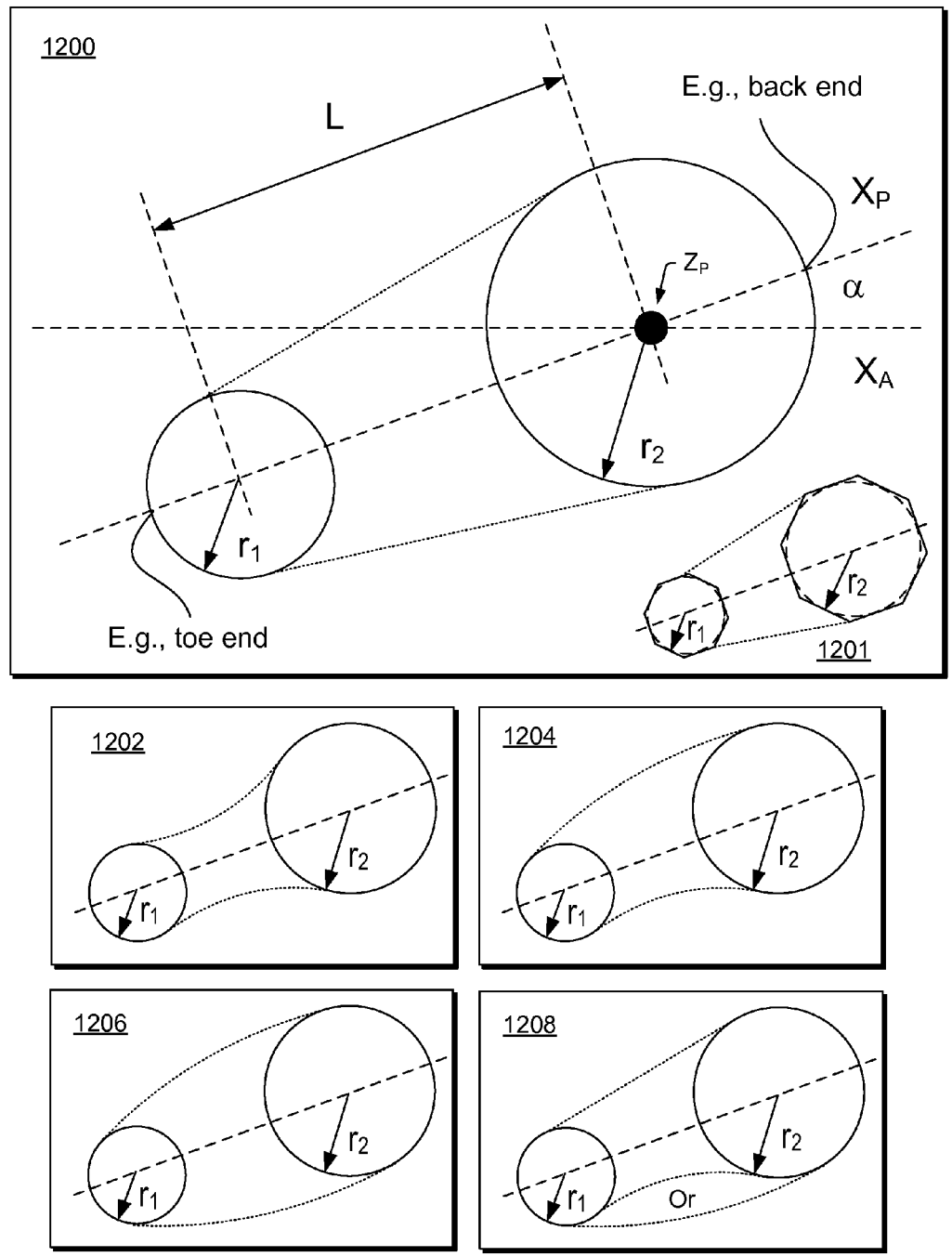
FIG. 12 is series of example plots and dimensions of examples of wastegate plugs, examples of wastegate openings (e.g., a wall that defines a wastegate opening) and/or examples of wastegate seats.

FIG. 12 shows an example of a plot 1200 and associated dimensions, which may be dimensions of a wastegate plug and/or a wastegate opening (e.g., a wall that defines a wastegate opening). As shown, two circles of different radii ($r_1$ and $r_2$) may be spaced at a distance L (e.g., consider radii with diameter dimensions D1 and D2). In the example of FIG. 12, the plot 1200 may define a shape a seal surface of a wastegate plug (e.g., a plug portion) that includes a toe end and a back end where the back end includes a radius of curvature (e.g., $r_2$) that exceeds a radius of curvature (e.g., $r_1$) of the toe end. As an example, the plot 1200 may define a shape of a wastegate opening. As an example, the plot 1200 may define a shape of a wastegate seat about a wastegate opening.

As an example, while two circles are shown in the plot 1200, one or more of the circles may be a shape such as an oval, an ellipse, etc. As an example, a plug, an opening, a seat, etc. may include one or more segments (e.g., line segments) that define a toe end and/or a back end. As an example, a polygon may include segments that can define a radius of curvature. For example, an example plot 1201 includes a toe end defined in part by a first polygon with a first radius and a back end defined in part by a second polygon with a second radius where the second radius exceeds the first radius. In such an example, consider the first polygon and/or the second polygon being, for example, a hexagon, an octagon, etc., which may be defined in part by a respective radius (e.g., $r_1$ and $r_2$).

In the example plot 1200, straight lines are shown joining the two circles. As an example, a shape of a plug, an opening, a seat, etc. may include straight edges (e.g., a perimeter formed by straight lines) between two radiused edges (e.g., at a toe end and at a back end). As an example, a shape of a plug, an opening, a seat, etc. may include edges that are at least in part curved between two radiused edges (e.g., at a toe end and at a back end). For example, in plots 1202, 1204, 1206 and 1208, at least one curved edge is illustrated. As an example, a shape of a plug, an opening, a seat, etc. may include a perimeter that is convex or that is not convex (e.g., as defined by drawing a line between two points within the perimeter).

In the example plot 1200 of FIG. 12, an angle α may define an angle of a direction of actuation versus a direction of orientation. For example, a plug may move at an angle with respect to the horizontal axis in FIG. 12 while being oriented at the tilting axis with respect to a wastegate opening. As an example, an arm may be coupled to a plug to move the plug where the arm defines in part an axis of movement of the plug (see, e.g., $X_A$) and an axis of orientation of the plug, for example, with respect to centers of two circles as shown in the plot 1200 (see, e.g., $X_P$). As shown, an axis of a stem, peg, etc. ($Z_P$) may (e.g., or may not) coincide with a center of the larger circle.

As an example, a shape of a plug may be defined at least in part via a common tangent as a line between two coplanar circles (e.g., a line that is tangent to each of two coplanar circles). As an example, a common tangent may be tangent internally or externally, noting that where two circles contact each other a tangent line may exist for that contact point. A common external tangent is a common tangent that does not intersect a segment that joins the centers of the two circles. For example, in the plot 1200 of FIG. 12, two common external tangents are shown.

The points of tangency $t_1$ and $t_2$ for the four lines tangent to two circles with centers $x_1$ and $x_2$ and radii $r_1$ and $r_2$ are given by solving the simultaneous equations:

$$(t_2-x_2)\cdot(t_2-t_1)=0 \qquad (1)$$

$$(t_1-x_1)\cdot(t_2-t_1)=0 \qquad (2)$$

$$|t_1-x_1|^2=r_1^2 \qquad (3)$$

$$|t_2-x_2|^2=r_2^2. \qquad (4)$$

The point of intersection of the two crossing tangents is called the internal similitude center and the point of intersection of the extensions of the other two tangents is called the external similitude center.

As an example, an area of a plug (e.g., a projected area) may be convex or not. For example, given two points within the area, a straight line drawn between the two points may not cross a perimeter of the area and, thus, the area may be considered to be convex. As an example, a perimeter may include a shape such that a line drawn between two points in the area crosses the perimeter and, thus, the area may be considered to not be convex.

As an example, a wastegate plug that includes a non-circular shape may allow for a smaller flow area upon opening when compared to a wastegate plug that includes a circular shape (i.e., circular perimeter). In such an example, load on an actuator may be reduced for the plug with the non-circular shape when compared to the plug with the circular shape. As an example, an actuator may be electrical, pneumatic, mechanical, etc.

As an example, an opening defined by a housing may be sized and shape to achieve desired flow areas with respect to various open orientations of a plug. As an example, a seat may be disposed about an opening that can seat a sealing surface of a plug. As an example, a seat and a sealing surface may be sized and/or shaped as desired. As an example, an opening may include a toe end and a back end while a plug may include a sealing surface that may differ in shape than the opening.

As an example, an opening may be defined via one or more parameters of the plot 1200 of FIG. 12. As an example, a seat may be defined at least in part via one or more parameters of the plot 1200 of FIG. 12. As an example, a sealing surface of a plug may be defined at least in part via one or more parameters of the plot 1200 of FIG. 12.

Figure 13A:
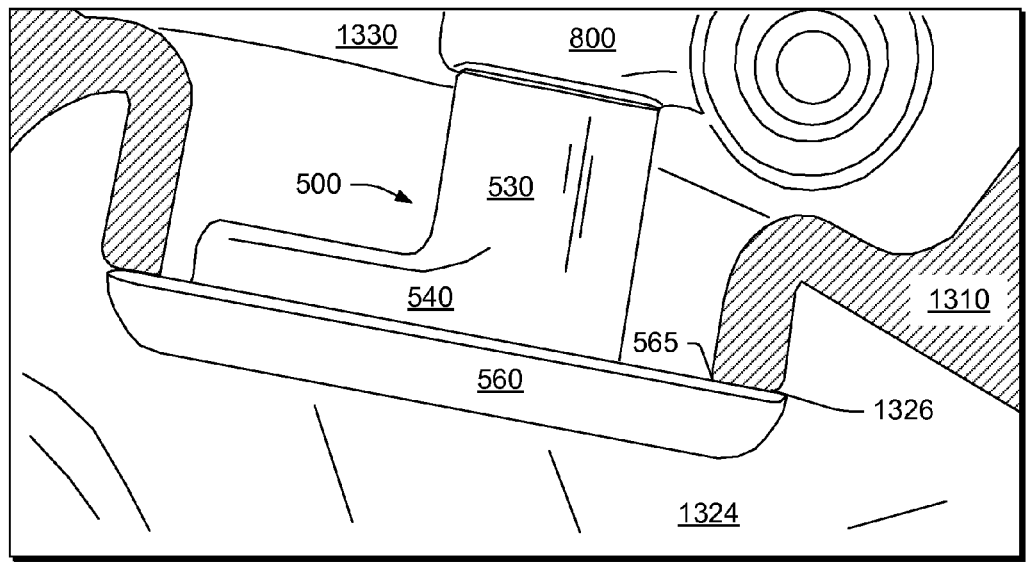
FIGS. 13A and 13B are cut-away views of an example of an assembly in a closed orientation and in an open orientation.
Figure 13B:
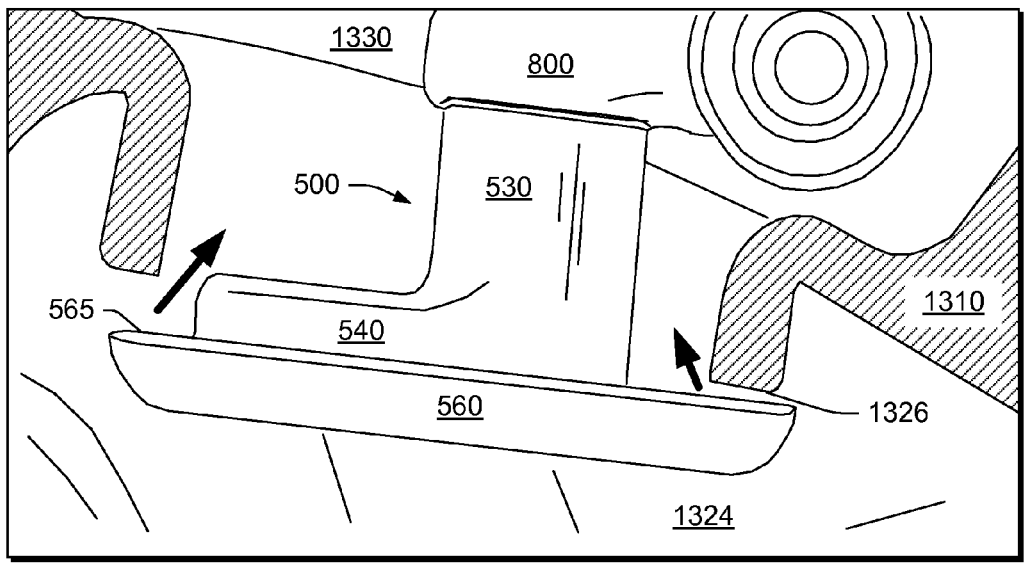

FIGS. 13A and 13B show cutaway views of an example of an assembly with the plug 500, as operatively coupled to the arm and shaft unit 800, in a closed orientation 1301 and in an open orientation 1303. As shown, a turbine housing 1310 includes a wastegate seat 1326 that faces toward a passage 1324 rather than toward a chamber 1330. As mentioned, a plug may open to a chamber rather than to a passage. For example, a turbine housing can include a wastegate seat that faces a chamber rather than facing a passage.

In the example of FIGS. 13A and 13B, rotation of the shaft 820 in a bore of the housing 1310 causes rotation of the arm 840, which is operatively coupled to the plug 500. In the example of FIGS. 13A and 13B, counter-clockwise rotation of the shaft 820 causes the plug 500 to transition from the closed orientation 1301 to the open orientation 1303. As an example, a plot such as the plot 400 of FIG. 4 may indicate a mass flow for stated conditions give an opening angle that corresponds to the opening angle of the open orientation 1303. In the example of FIGS. 13A and 13B, force may be applied to the plug 500 via operation of the shaft 820 to cause the plug 500 to overcome a pressure differential between the passage 1324 and the chamber 1330.

Figure 14A:
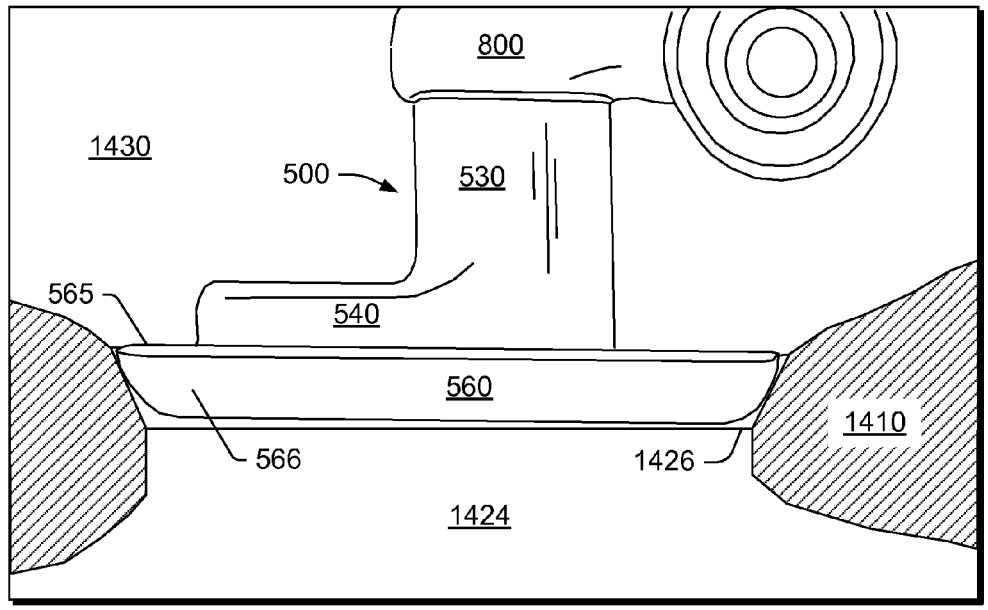
FIGS. 14A and 14B are cut-away views of an example of an assembly in a closed orientation and in an open orientation.
Figure 14B:
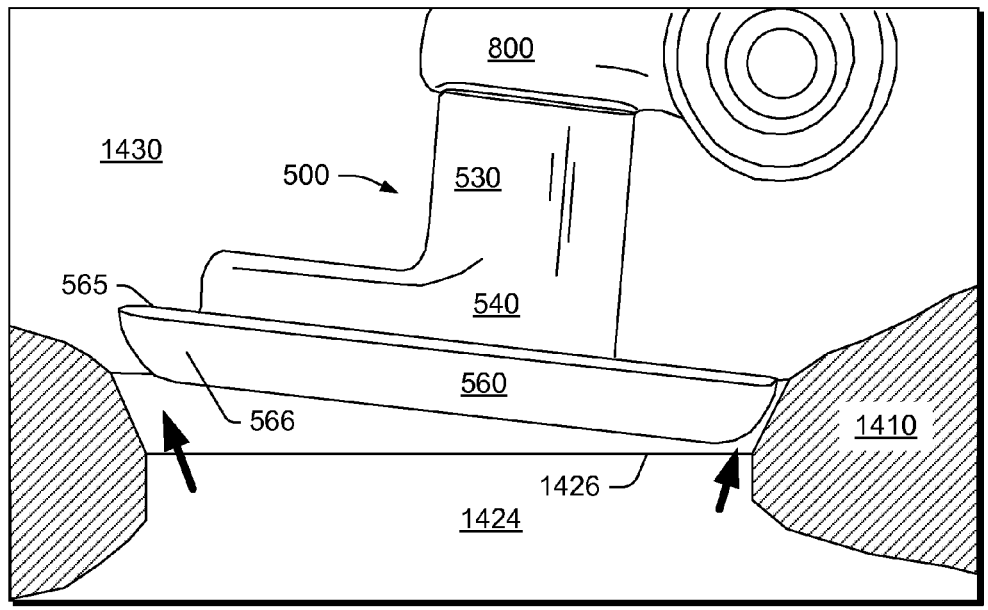

FIGS. 14A and 14B show cutaway views of an example of an assembly with the plug 500, as operatively coupled to the arm and shaft unit 800, in a closed orientation 1401 and in an open orientation 1403. As shown, a turbine housing 1410 includes a wastegate seat 1426 that faces toward a chamber 1430.

In the example of FIGS. 14A and 14B, rotation of the shaft 820 in a bore of the housing 1410 causes rotation of the arm 840, which is operatively coupled to the plug 500. In the example of FIGS. 14A and 14B, clockwise rotation of the shaft 820 causes the plug 500 to transition from the closed orientation 1401 to the open orientation 1403. As an example, a plot such as the plot 400 of FIG. 4 may indicate a mass flow for stated conditions give an opening angle that corresponds to the opening angle of the open orientation 1403.

Figure 15A:
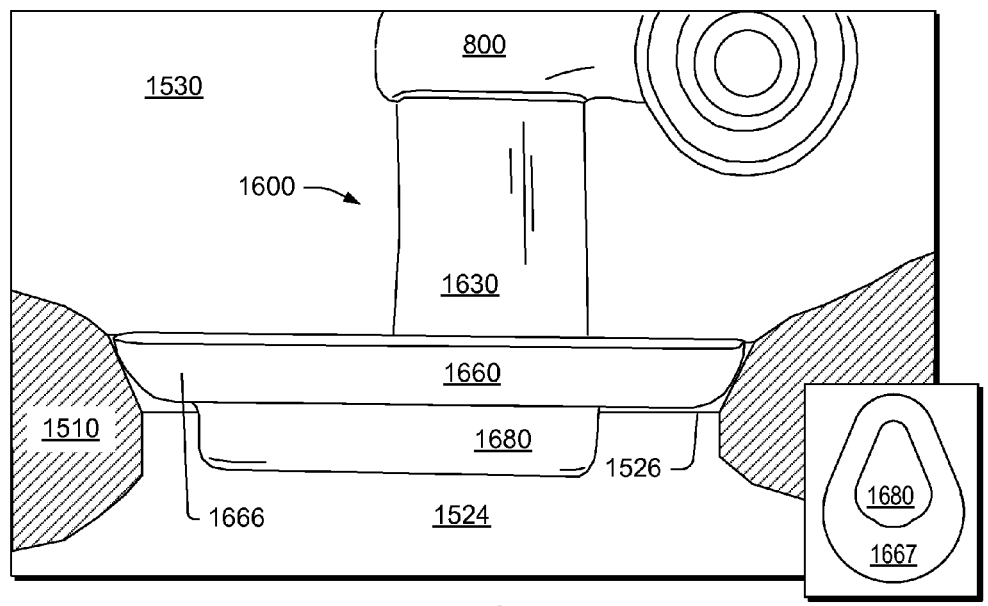
FIGS. 15A and 15B are cut-away views of an example of an assembly in a closed orientation and in an open orientation.
Figure 15B:
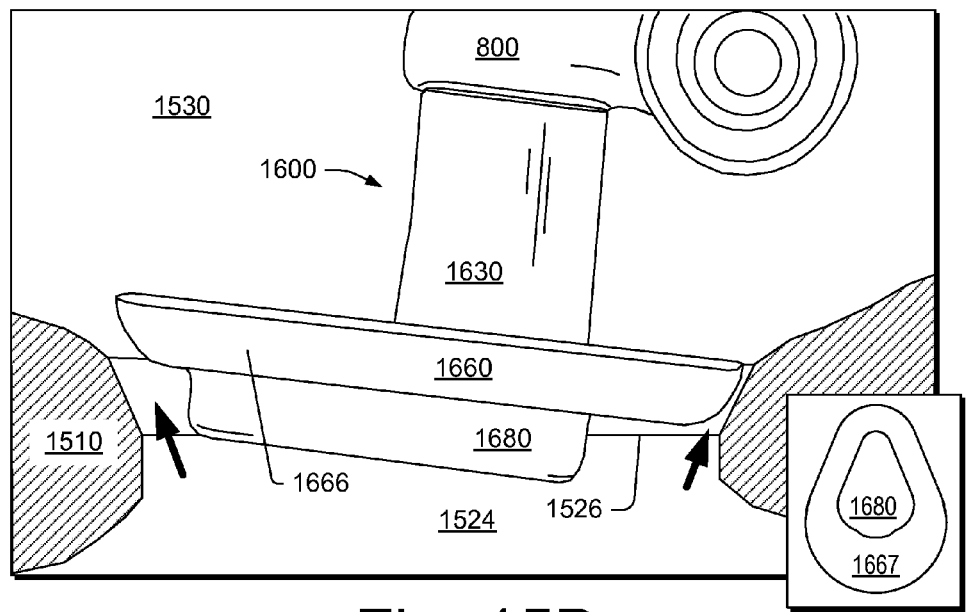

FIGS. 15A and 15B show cutaway views of an example of an assembly with a plug 1600, as operatively coupled to the arm and shaft unit 800, in a closed orientation 1501 and in an open orientation 1503. As shown, a turbine housing 1510 includes a passage 1524 and a wastegate seat 1526 that faces toward a chamber 1530.

In the example of FIGS. 15A and 15B, rotation of the shaft 820 in a bore of the housing 1510 causes rotation of the arm 840, which is operatively coupled to the plug 1600. In the example of FIGS. 15A and 15B, clockwise rotation of the shaft 820 causes the plug 1600 to transition from the closed orientation 1501 to the open orientation 1503. As an example, a plot such as the plot 400 of FIG. 4 may indicate a mass flow for stated conditions give an opening angle that corresponds to the opening angle of the open orientation 1503.

As shown in the example of FIGS. 15A and 15B, the plug 1600 includes a stem 1630, a plug portion 1660 and an elevated portion 1680 (e.g., elevated away from a surface 1667 of the plug portion 1660). The plug portion 1660 includes a seal surface 1666 that can seat against the seat 1526 of the housing 1510, for example, as shown in the closed orientation 1501. As illustrated, upon transitioning to the open orientation 1503, the elevated portion 1680 may define a flow area with respect to, for example, the seat 1526 of the housing 1510. In the example of FIGS. 15A and 15B, the elevated portion 1680 may be disposed at least in part between a plug axis (e.g., as may be defined by the stem 1630) and a toe end of the plug portion 1660. In such a manner, the elevated portion 1680 may influence fluid dynamics as exhaust flows from the passage 1524 to the chamber 1530 (e.g., to bypass a volute of that can direct exhaust to a turbine wheel space).

Figure 16A:
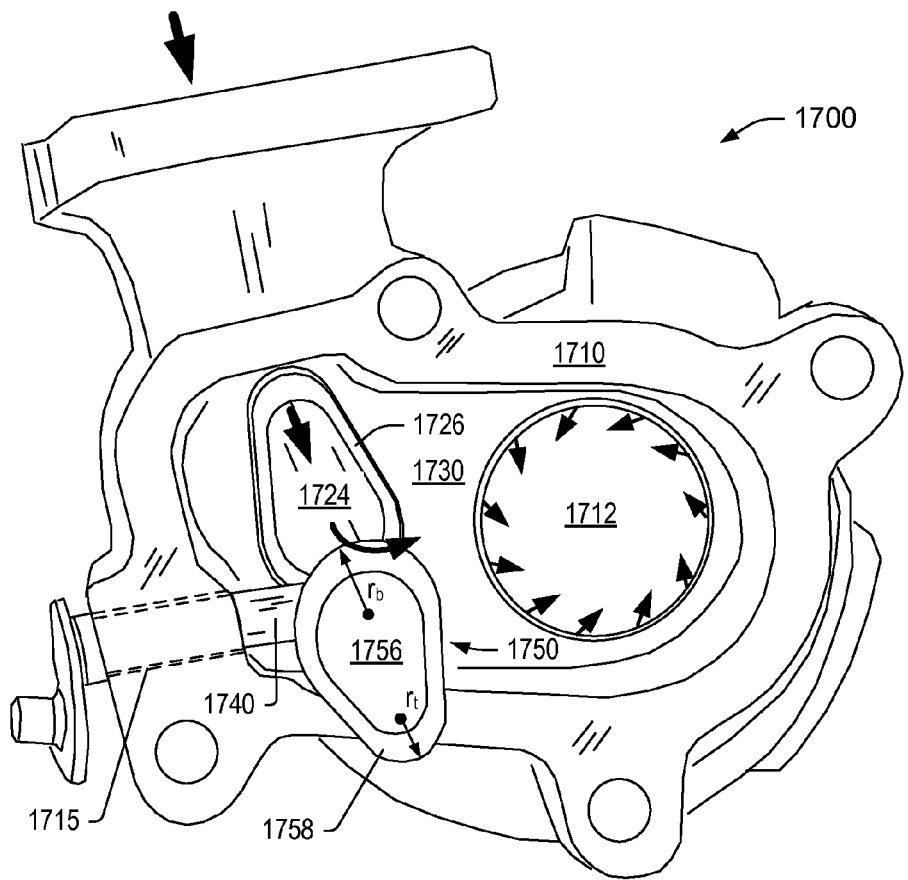
FIGS. 16A and 16B are a plan view of an example of an assembly and a cut-away view of the assembly.
Figure 16B:
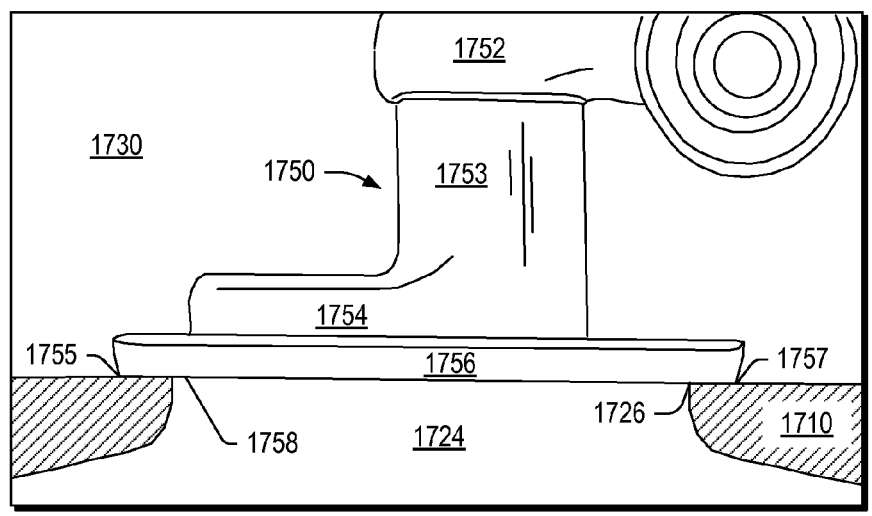

FIGS. 16A and 16B show a plan view of an example of an assembly 1700 and a cut-away view of a portion of the assembly 1700. As shown, the assembly 1700 includes a housing 1710 with a turbine wheel space 1712 that can receive, at least in part, a turbine wheel that can be rotatably driven by flow of exhaust to the housing 1710. As shown, the housing 1710 also includes a bore 1715 that extends from an exterior surface of the housing 1710 to an interior chamber 1730 defined at least in part by the housing 1710 where a passage 1724 extends to an opening to the chamber 1730 that is surrounded by a wastegate seat 1726. As shown, a shaft 1740 is received by the bore 1715 and operatively coupled to a wastegate arm and plug 1750 (e.g., optionally a subassembly or an integrally cast, unitary component). In the example of FIGS. 16A and 16B, the wastegate arm and plug 1750 includes an arm 1752, a stem 1753, a base 1754 and a plug portion 1756 where the plug portion 1756 includes a lower, flat surface 1758 that can seat against the wastegate seat 1726 to seal the passage 1724. In FIG. 16A, arrows indicate various approximate directions of exhaust flow. For example, exhaust can flow into the housing 1710 and through the passage 1724 to the chamber 1730 when the wastegate arm and plug 1750 is in an open orientation with respect to the wastegate seat 1726 and where the wastegate arm and plug 1750 is in a closed orientation with respect to the wastegate seat 1726, exhaust can flow to the turbine wheel space 1712 and then to the chamber 1730. Depending on orientation angle for open orientations, a portion of exhaust entering the housing 1710 may flow via a clearance between the plug portion 1756 and the wastegate seat 1726 and a portion of exhaust may flow to the turbine wheel space 1712 (e.g., to drive a turbine wheel).

As shown in the example of FIGS. 16A and 16B, the wastegate plug portion 1756, as extending from the wastegate arm 1752 (e.g., operatively coupled to or integral to the wastegate arm 1752), includes the flat surface 1758 as seal surface where the flat surface 1758 includes a toe end 1755 and a back end 1757 where the back end 1757 includes a radius of curvature (see, e.g., $r_b$) that exceeds a radius of curvature (see, e.g., $r_t$) of the toe end 1755.

Figure 17:
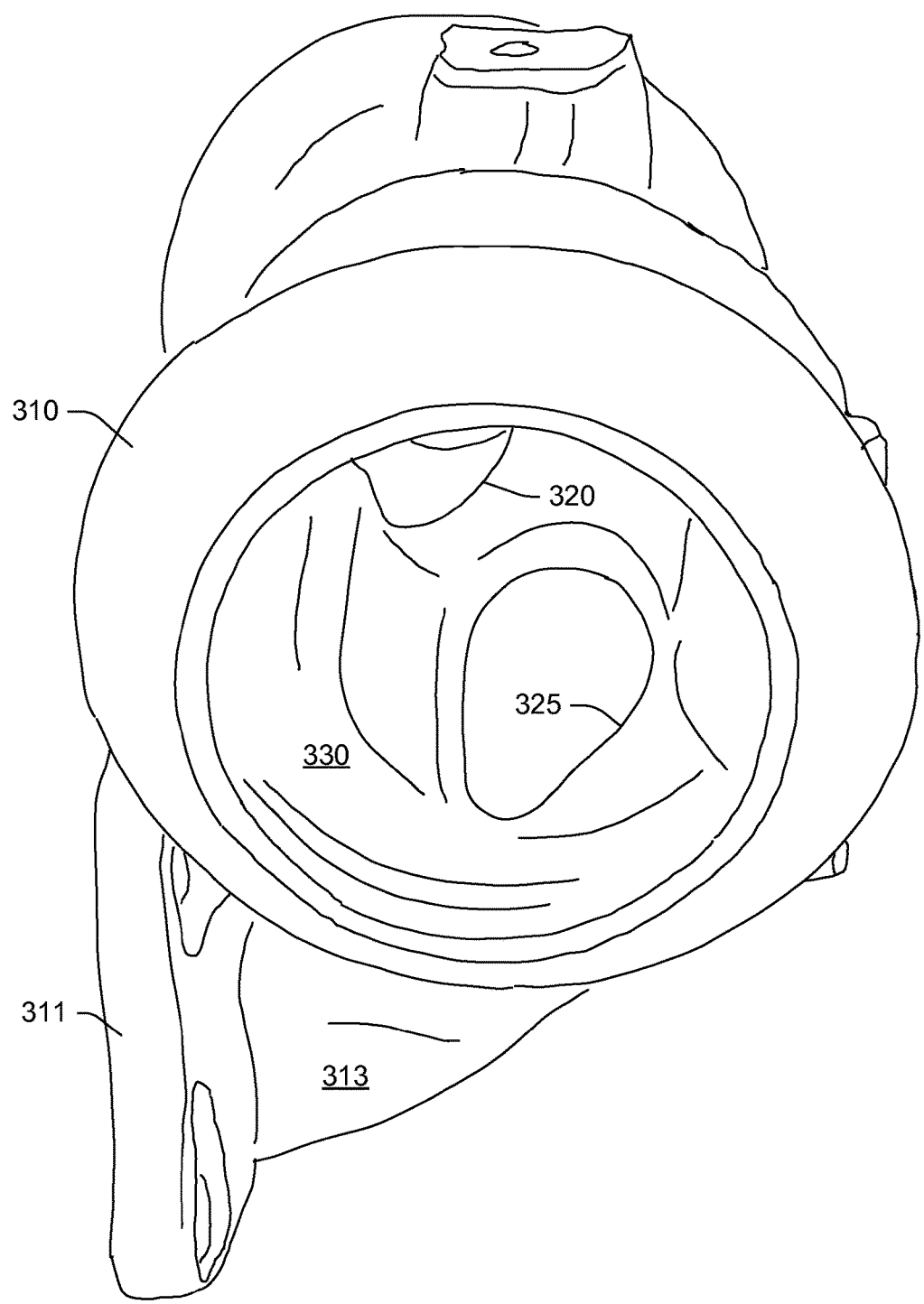
FIG. 17 is a perspective view of the turbine housing of FIG. 3.

FIG. 17 shows a perspective view of the turbine housing 310 of FIG. 3. As shown in FIG. 17, the wastegate opening 325 may be defined via a plot such as the plot 1200 of FIG. 12. As an example, a plot may be scaled down for defining a shape of a wastegate opening in comparison to defining a seal surface of a plug.

Figure 18:
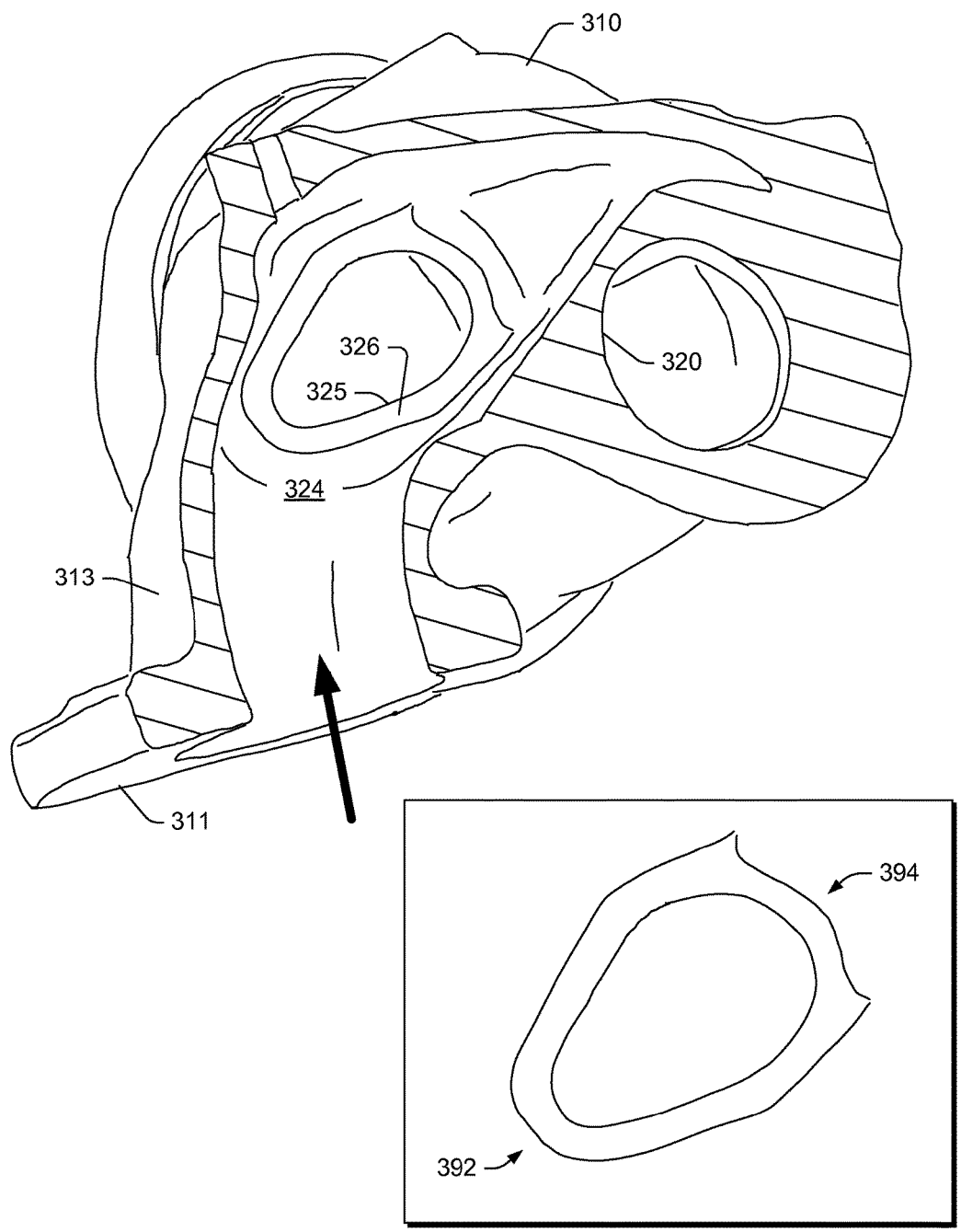
FIG. 18 is a cutaway view of the turbine housing of FIG. 3.

FIG. 18 shows a cutaway view of the turbine housing 310 of FIG. 3. In FIG. 18, the wastegate seat 326 faces the passage 324 rather than facing the chamber 330. As shown, the passage 324 extends from the flange 311 and the inlet conduit 313. The passage 324 continues to a volute (see, e.g., the volute 222 of FIGS. 2A and 2B) which is disposed about the turbine wheel space 320. As shown in FIG. 18, the opening 325 can include a toe end 392 and a back end 394. As an example, the wastegate seat 326 can include a toe end 392 and a back end 394.

An assembly can include a turbine housing that defines a bore, a wastegate opening, a wastegate passage to one side of the wastegate opening and a chamber to another side of the wastegate opening and that includes a wastegate seat disposed about the wastegate opening; a rotatable wastegate shaft configured for receipt by the bore; a wastegate arm that extends from the wastegate shaft; and a wastegate plug that extends from the wastegate arm where the wastegate plug includes a seal surface that includes a toe end and a back end where the back end includes a radius of curvature that exceeds a radius of curvature of the toe end. In such an example, the wastegate plug may include an elevated portion that extends axially upwardly from the seal surface toward the wastegate arm. As an example, an assembly can include a wastegate plug that includes an elevated portion that extends axially downwardly from a seal surface.

As an example, an assembly can include a wastegate seat that is disposed about a wastegate opening facing a wastegate passage or a wastegate seat that is disposed about a wastegate opening facing a chamber.

As an example, a plug portion can include a seal surface with a toe end, a back end and a perimeter defined by a radiused portion of the toe end and a radiused portion of the back end. In such an example, the perimeter may be defined by at least one straight portion that extends between the radiused portion of the toe end and the radiused portion of the back end and/or the perimeter may be defined by at least one curved portion that extends between the radiused portion of the toe end and the radiused portion of the back end. As an example, a perimeter may be defined by at least two curved portions that extend between a radiused portion of a toe end and a radiused portion of a back end.

As an example, an assembly can include a wastegate opening that includes a toe end and a back end. In such an example, the back end of the wastegate opening can include a radius of curvature that exceeds a radius of curvature of the toe end of the wastegate opening. As an example, a wastegate opening may be defined by at least one straight line that extends between a radius of curvature of a toe end and a radius of curvature of A back end, may be defined by at least one curved line that extends between a radius of curvature of a toe end and a radius of curvature of a back end or may be defined by at least one straight line and at least one curved line that extend at least in part between a radius of curvature of a toe end and a radius of curvature of a back end.

As an example, a wastegate seat can include a toe end and a back end. In such an example, the back end of the wastegate seat can include a radius of curvature that exceeds a radius of curvature of the toe end of the wastegate seat.

As an example, a turbocharger can include a compressor assembly; a center housing assembly; and a turbine assembly that includes a turbine housing that defines a bore, a wastegate opening, a wastegate passage to one side of the wastegate opening and a chamber to another side of the wastegate opening and that includes a wastegate seat disposed about the wastegate opening; a rotatable wastegate shaft configured for receipt by the bore; a wastegate arm that extends from the wastegate shaft; and a wastegate plug that extends from the wastegate arm where the wastegate plug includes a seal surface that includes a toe end and a back end where the back end includes a radius of curvature that exceeds a radius of curvature of the toe end. In such an example, the wastegate seat may be disposed about the wastegate opening facing the wastegate passage or the wastegate seat may be disposed about the wastegate opening facing the chamber.

As an example, an assembly can include a turbine housing that defines a bore, a wastegate opening, a wastegate passage to one side of the wastegate opening and a chamber to another side of the wastegate opening and that includes a wastegate seat disposed about the wastegate opening where the wastegate opening includes a toe end and a back end where the back end includes a radius of curvature that exceeds a radius of curvature of the toe end; a rotatable wastegate shaft configured for receipt by the bore; a wastegate arm that extends from the wastegate shaft; and a wastegate plug that extends from the wastegate arm where the wastegate plug includes a seal surface that contacts the wastegate seat in a closed orientation of the wastegate plug with respect to the wastegate opening. In such an example, the wastegate seat may be disposed about the wastegate opening facing the wastegate passage or the wastegate seat may be disposed about the wastegate opening facing the chamber.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
    a turbine housing that defines an inlet, a bore, a volute, a wastegate opening, a passage to one side of the wastegate opening that extends in a direction of flow from the inlet to the volute, and a chamber to another side of the wastegate opening, wherein the turbine housing comprises a wastegate seat disposed about the wastegate opening, wherein the wastegate seat and the wastegate opening meet at a perimeter of the wastegate opening that comprises an upstream toe end and a downstream back end oriented in the direction of flow from the inlet to the volute, and wherein the downstream back end of the perimeter of the wastegate opening comprises a radius of curvature that exceeds a radius of curvature of the upstream toe end of the perimeter of the wastegate opening;

a rotatable wastegate shaft configured for receipt by the bore;

a wastegate arm that extends from the rotatable wastegate shaft; and a wastegate plug that extends from the wastegate arm, wherein the wastegate plug comprises a seal surface that comprises a toe end and a back end, wherein, responsive to rotation of the rotatable wastegate shaft in the bore, the wastegate plug transitions the wastegate opening from a closed state to an open state, wherein, in the closed state, the seal surface of the wastegate plug contacts the wastegate seat, and wherein, in the open state, the toe end of the seal surface of the wastegate plug defines an upstream toe end clearance with respect to the wastegage seat at the upstream toe end perimeter and the back end of the seal surface of the wastegate plug defines a downstream back end clearance with respect to the wastegate seat at the downstream back end perimeter, wherein the defined upstream toe end clearance exceeds the defined downstream back end clearance.

2. The assembly of claim 1 wherein the wastegate plug comprises an elevated portion that extends axially upwardly from the seal surface toward the wastegate arm.

3. The assembly of claim 1 wherein the wastegate plug comprises an elevated portion that extends axially downwardly from the seal surface.

4. The assembly of claim 1 wherein the wastegate seat is disposed about the wastegate opening facing the passage.

5. The assembly of claim 1 wherein the wastegate seat is disposed about the wastegate opening facing the chamber.

6. The assembly of claim 1 wherein the seal surface comprises a perimeter defined by a radiused portion of the toe end of the seal surface and a radiused portion of the back end of the seal surface.

7. The assembly of claim 6 wherein the perimeter is defined by at least one straight portion that extends between the radiused portion of the toe end of the seal surface and the radiused portion of the back end of the seal surface.

8. The assembly of claim 6 wherein the perimeter is defined by at least one curved portion that extends between the radiused portion of the toe end of the seal surface and the radiused portion of the back end of the seal surface.

9. The assembly of claim 8 wherein the perimeter is defined by at least two curved portions that extend between the radiused portion of the toe end of the seal surface and the radiused portion of the back end of the seal surface.

10. The assembly of claim 1 wherein the perimeter of the wastegate opening is defined by at least one straight line that extends between the radius of curvature of the upstream toe end of the perimeter and the radius of curvature of the downstream back end of the perimeter or wherein the perimeter of the wastegate opening is defined by at least one straight line and at least one curved line that extend at least in part between the radius of curvature of the upstream toe end of the perimeter and the radius of curvature of the downstream back end of the perimeter.

11. A turbocharger comprising:

a compressor assembly;

a center housing assembly; and a turbine assembly that comprises a turbine housing that defines an inlet, a bore, a volute, a wastegate opening, a passage to one side of the wastegate opening that extends in a direction of flow from the inlet to the volute, and a chamber to another side of the wastegate opening, wherein the turbine housing comprises a wastegate seat disposed about the wastegate opening, wherein the wastegate seat and the wastegate opening meet at a perimeter of the wastegate opening that comprises an upstream toe end and a downstream back end oriented in the direction of flow from the inlet to the volute, and wherein the downstream back end of the perimeter of the wastegate opening comprises a radius of curvature that exceeds a radius of curvature of the upstream toe end of the perimeter of the wastegate opening;

a rotatable wastegate shaft configured for receipt by the bore;

a wastegate arm that extends from the rotatable wastegate shaft; and a wastegate plug that extends from the wastegate arm, wherein the wastegate plug comprises a seal surface that comprises a toe end and a back end, wherein, responsive to rotation of the rotatable wastegate shaft in the bore, the wastegate plug transitions the wastegate opening from a closed state to an open state, wherein, in the closed state, the seal surface of the wastegate plug contacts the wastegate seat, and wherein, in the open state, the toe end of the seal surface of the wastegate plug defines an upstream toe end clearance with respect to the wastegate seat at the toe end perimeter and the back end of the seal surface of the wastegate plug defines a downstream back end clearance with respect to the wastegate seat at the back end perimeter, wherein the defined upstream toe end clearance exceeds the defined downstream back end clearance.

* * * * *